United States Patent
Zhu

(10) Patent No.: US 11,190,298 B2
(45) Date of Patent: Nov. 30, 2021

(54) METHODS AND APPARATUSES FOR DETERMINING NUMBER OF TIMES OF BLIND DECODING SCHEDULE SIGNALING, USER EQUIPMENT AND BASE STATION

(71) Applicant: BEIJING XIAOMI MOBILE SOFTWARE CO., LTD., Beijing (CN)

(72) Inventor: Yajun Zhu, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 49 days.

(21) Appl. No.: 16/623,013

(22) PCT Filed: Jun. 16, 2017

(86) PCT No.: PCT/CN2017/088803
§ 371 (c)(1),
(2) Date: Dec. 16, 2019

(87) PCT Pub. No.: WO2018/227627
PCT Pub. Date: Dec. 20, 2018

(65) Prior Publication Data
US 2021/0152280 A1 May 20, 2021

(51) Int. Cl.
H04L 29/06 (2006.01)
H04L 1/00 (2006.01)
(52) U.S. Cl.
CPC .................. *H04L 1/0038* (2013.01)
(58) Field of Classification Search
CPC ... H04L 5/0048; H04L 5/0055; H04L 1/1861; H04W 72/042; H04W 72/1289;
(Continued)

(56) References Cited

U.S. PATENT DOCUMENTS

| 8,139,535 B2 | 3/2012 | Hsuan et al. |
| 2012/0230266 A1* | 9/2012 | Xie ................... H04L 5/0053 370/329 |
| 2015/0189628 A1 | 7/2015 | Pan et al. |

FOREIGN PATENT DOCUMENTS

| CN | 103546233 A | 1/2014 |
| CN | 106301674 A | 1/2017 |

(Continued)

OTHER PUBLICATIONS

Written Opinion of the ISA issued in Application No. PCT/CN2017/088803, dated Feb. 27, 2018, (9p).

(Continued)

*Primary Examiner* — Phuoc H Doan
(74) *Attorney, Agent, or Firm* — Arch & Lake LLP

(57) ABSTRACT

The present disclosure provides a method and an apparatus for determining a number of blind decoding attempts of schedule signaling, UE, a base station, and a computer-readable storage medium. The method of determining a number of blind decoding attempts of schedule signaling includes: acquiring control resource set attribute information for each transmission unit, where the control resource set attribute information indicates an attribute of a control resource set corresponding to the transmission unit, and one or more control resource sets are configured for the transmission unit and acquiring number of blind decoding attempts information associated with the control resource set attribute information; and determining a maximum number of blind decoding attempts of the schedule signaling on each control resource set is determined according to the control resource set attribute information and the number of blind decoding attempts information associated with the control resource set attribute information.

20 Claims, 9 Drawing Sheets

---

Acquire control resource set attribute information on each transmission unit, and acquire blind-decoding-time-number information associated with the control resource set attribute information — S101

Determine a maximum number of times of blind decoding schedule signaling on each control resource set according to the control resource set attribute information and the blind-decoding-time-number information associated with the control resource set attribute information — S102

(58) Field of Classification Search
CPC ............. H04W 52/0216; H04W 72/02; H04W 72/044; G06F 3/0619; G06F 3/017
See application file for complete search history.

(56) References Cited

FOREIGN PATENT DOCUMENTS

| | | |
|---|---|---|
| CN | 16301674 A | 4/2017 |
| JP | 2014523718 A | 9/2014 |
| WO | 2008115021 A1 | 9/2008 |

OTHER PUBLICATIONS

ISA State Intellectual Property Office of the People's Republic of China, International Search Report Issued in Application No. PCT/CN2017/088803, dated Feb. 27, 2018, WIPO, 4 pages.
Huawei et al., "Considerations on Blind Decoding for MTC UEs", 3GPP TSG RAN WG 1 Meeting #82, R1-153753, Aug. 28, 2015, 6 pages.

* cited by examiner

METHODS AND APPARATUSES FOR DETERMINING NUMBER OF TIMES OF BLIND DECODING SCHEDULE SIGNALING, USER EQUIPMENT AND BASE STATION

CROSS REFERENCE TO RELATED APPLICATION

The present application is the U.S. national phase of PCT Application No. PCT/CN2017/088,803 filed on Jun. 16, 2017, which is incorporated herein by reference in its entirety.

TECHNICAL FIELD

The present disclosure relates to the field of communications technology, and in particular, to methods and apparatuses for determining a number of times of blind decoding schedule signaling, user equipment, a base station, and a computer-readable storage medium.

BACKGROUND

The emergence of new Internet applications, such as the new generation of Augmented Reality (AR), Virtual Reality (VR), vehicle-to-vehicle communication and the like, proposes higher demands on wireless communication technology and drives the continuous evolution of wireless communication technology to meet the demands of the applications. At present, cellular mobile communication technology is in the evolution stage of the new generation technology. An important feature of the new generation technology is to support flexible configuration of multiple service types. Different types of services have different requirements for the wireless communication technology. For example, the main requirements of a service type of enhanced Mobile Broad Band (eMBB) are focused on broad bandwidth and high speed, the main requirements of a service type of Ultra Reliable Low Latency Communication (URLLC) are focused on high reliability and low latency, and the main requirements of a service type of massive Machine Type Communication (mMTC) are focused on a large number of connections. Therefore, the new generation of wireless communication systems requires flexible and configurable designs to support the transmission with the multiple service types.

In a Long Term Evolution (LTE) system, uplink and downlink transmissions for a terminal are based on scheduling by a base station. The base station instructs the terminal to receive or transmit data at a corresponding resource location through a notification manner which downlink or uplink schedule signaling is transmitted. For dynamic scheduling, a piece of schedule signaling can only indicate transmission in a transmission unit, such as a subframe. Under the dynamic scheduling of the LTE system, the terminal has to decode whether there is schedule signaling for itself in each subframe. The decoding method is to search a corresponding Downlink Control Information (DCI) format according to a supported transmission mode in a search space where the downlink schedule signaling is located. A number of times for decoding supported by the terminal in each subframe affects performance of decoding the schedule signaling and decoding complexity of the terminal. The larger the number of times for decoding is, the better the performance of decoding the schedule signaling will be, but the decoding complexity and power consumption of the terminal will be increased accordingly. In addition, in the LTE system, the terminal is finally defined to perform up to 44 times of decoding.

For the conventional LTE system, a control resource set occupies the entire portion of bandwidth in the frequency domain, that is, for all terminals, there is only one control resource set. In the new generation communication system, since the carrier bandwidth of the supported operational carrier may be relatively large, the terminal may support multiple control resource sets, and there is a technical problem needs to be solved as how to determine the number of times of blind decoding the schedule signaling on each control resource set.

SUMMARY

In view of this, the present application discloses a method, an apparatuses for determining a number of times of blind decoding schedule signaling, user equipment (UE), a base station, and a computer-readable storage medium, so that the UE can determine a maximum number of times of blind decoding the schedule signaling on each control resource set if one or more control resource sets are configured for the UE.

According to a first aspect of examples of the present disclosure, there is provided a method of determining a number of times of blind decoding schedule signaling. The method includes:

acquiring control resource set attribute information on each transmission unit, and acquiring blind-decoding-time-number information associated with the control resource set attribute information, where the control resource set attribute information indicates an attribute of a control resource set corresponding to the transmission unit; and determining a maximum number of times of blind decoding schedule signaling on each control resource set according to the control resource set attribute information and the blind-decoding-time-number information associated with the control resource set attribute information.

In an example, acquiring the blind-decoding-time-number information associated with the control resource set attribute information includes:

receiving first configuration information transmitted by a base station, and determining a maximum number of times of blind decoding supported by each transmission unit belonging to each transmission unit type according to the first configuration information; or receiving second configuration information transmitted by the base station, and determining a maximum number of times of blind decoding supported by each transmission unit according to the second configuration information; or determining the maximum number of times of blind decoding supported by each transmission unit in a manner agreed by a system where present UE is located;

where the blind-decoding-time-number information associated with the control resource set attribute information includes the maximum number of times of blind decoding supported by each transmission unit.

In an example, acquiring the control resource set attribute information on each transmission unit includes:

receiving third configuration information transmitted by the base station, and acquiring a number of control resource sets on each transmission unit according to the third configuration information, where the third configuration information includes the number of control resource sets corresponding to each transmission unit, and the control resource set attribute information includes the number of control resource sets; and determining the maximum number of times of blind decoding the schedule signaling on each control resource set according to the control resource set attribute information and the blind-decoding-time-number information associated with the control resource set attribute information includes:

equally allocating the maximum number of times of blind decoding supported by each transmission unit to each control resource set corresponding to the transmission unit according to the number of control resource sets, so as to acquire the maximum number of times of blind decoding the schedule signaling on each control resource set.

In an example, acquiring the control resource set attribute information on each transmission unit includes:

receiving fourth configuration information transmitted by the base station, and acquiring a size of each control resource set on each transmission unit according to the fourth configuration information, where the fourth configuration information includes the size of each control resource set corresponding to each transmission unit, and the control resource set attribute information includes the size of the control resource set; and determining the maximum number of times of blind decoding the schedule signaling on each control resource set according to the control resource set attribute information and the blind-decoding-time-number information associated with the control resource set attribute information includes:

allocating the maximum number of times of blind decoding supported by each transmission unit to corresponding control resource sets corresponding to the transmission unit according to the size of each control resource set, so as to acquire the maximum number of times of blind decoding the schedule signaling on each control resource set.

In an example, acquiring the control resource set attribute information on each transmission unit and the blind-decoding-time-number information associated with the control resource set attribute information includes:

receiving fifth configuration information transmitted by a base station, and acquiring, according to the fifth configuration information, an aggregation level supported by each control resource set on each transmission unit and a maximum number of times of blind decoding the schedule signaling corresponding to each aggregation level, where the fifth configuration information includes the aggregation level supported by each control resource set and the maximum number of times of blind decoding the schedule signaling corresponding to each aggregation level, the control resource set attribute information includes the aggregation level supported by each control resource set, and the blind-decoding-time-number information associated with the control resource set attribute information includes the maximum number of times of blind decoding the schedule signaling corresponding to each aggregation level; or acquiring the aggregation level supported by each control resource set on each transmission unit and the maximum number of times of blind decoding the schedule signaling corresponding to each aggregation level in a manner agreed by a system where present UE is located, where the control resource set attribute information includes the aggregation level supported by each control resource set, and the blind-decoding-time-number information associated with the control resource set attribute information includes the maximum number of times of blind decoding the schedule signaling corresponding to each aggregation level; and determining the maximum number of times of blind decoding the schedule signaling on each control resource set according to the control resource set attribute information and the blind-decoding-time-number information associated with the control resource set attribute information includes:

determining the maximum number of times of blind decoding the schedule signaling on each control resource set according to the aggregation level supported by each control resource set on each transmission unit and the maximum number of times of blind decoding the schedule signaling corresponding to each aggregation level.

In an example, determining the maximum number of times of blind decoding the schedule signaling on each control resource set according to the aggregation level supported by each control resource set on each transmission unit and the maximum number of times of blind decoding the schedule signaling corresponding to each aggregation level includes:

calculating a sum of the maximum numbers of times of blind decoding the schedule signaling corresponding to respective ones of all the aggregation levels supported by each control resource set, and taking a product of the calculated sum times of blind decoding and a number of types of the schedule signaling as the maximum number of times of blind decoding the schedule signaling corresponding to the control resource set.

In an example, the first configuration information, the second configuration information, the third configuration information, the fourth configuration information, or the fifth configuration information is carried in a system message, Radio Resource Control (RRC) signaling, a Media Access Control (MAC) Control Element (CE) or physical layer signaling.

According to a second aspect of examples of the present disclosure, there is provided a method of determining a number of times of blind decoding schedule signaling. The method includes:

determining that a control resource set exists in at least one transmission unit of UE; and transmitting control resource set attribute information on each transmission unit to the UE, and transmitting blind-decoding-time-number information associated with the control resource set attribute information to the UE, for the UE to determine a maximum number of times of blind decoding schedule signaling on each control resource set according to the control resource set attribute information and the blind-decoding-time-number information associated with the control resource set attribute information.

In an example, transmitting the blind-decoding-time-number information associated with the control resource set attribute information to the UE includes:

transmitting first configuration information to the UE, for the UE to determine a maximum number of times of blind decoding supported by each transmission unit belonging to each transmission unit type according to the first configuration information; or transmitting second configuration information to the UE, for the UE to determine a maximum number of times of blind decoding supported by each transmission unit according to the second configuration information;

where the blind-decoding-time-number information associated with the control resource set attribute information includes the maximum number of times of blind decoding supported by each transmission unit.

In an example, transmitting the control resource set attribute information on each transmission unit to the UE includes:

transmitting, to the UE, third configuration information including a number of control resource sets corresponding to each transmission unit, for the UE to acquire the number of control resource sets on each transmission unit according to the third configuration information, where the control resource set attribute information includes the number of control resource sets.

In an example, transmitting the control resource set attribute information on each transmission unit to the UE includes:

transmitting, to the UE, fourth configuration information including a size of each control resource set corresponding to each transmission unit, for the UE to acquire the size of each control resource set on each transmission unit according to the fourth configuration information, where the control resource set attribute information includes the size of the control resource set.

In an example, transmitting the control resource set attribute information on each transmission unit to the UE and transmitting the blind-decoding-time-number information associated with the control resource set attribute information to the UE, includes:

transmitting fifth configuration information to the UE, for the UE to acquire an aggregation level supported by each control resource set on each transmission unit and a maximum number of times of blind decoding the schedule signaling corresponding to each aggregation level according to the fifth configuration information, where the fifth configuration information includes the aggregation level supported by each control resource set and the maximum number of times of blind decoding the schedule signaling corresponding to each aggregation level, the control resource set attribute information includes the aggregation level supported by each control resource set, and the blind-decoding-time-number information associated with the control resource set attribute information includes the maximum number of times of blind decoding the schedule signaling corresponding to each aggregation level.

In an example, the first configuration information, the second configuration information, the third configuration information, the fourth configuration information, or the fifth configuration information is carried in a system message, RRC signaling, a MAC CE or physical layer signaling.

According to a third aspect of examples of the present disclosure, there is provided an apparatus for determining a number of times of blind decoding schedule signaling. The apparatus includes:

an acquiring module configured to acquire control resource set attribute information on each transmission unit, and acquire blind-decoding-time-number information associated with the control resource set attribute information, where the control resource set attribute information indicates an attribute of a control resource set corresponding to the transmission unit; and a determining module configured to determine a maximum number of times of blind decoding schedule signaling on each control resource set according to the control resource set attribute information and the blind-decoding-time-number information associated with the control resource set attribute information which are acquired by the acquiring module.

In an example, the acquiring module includes:

a first receiving sub-module configured to receive first configuration information transmitted by a base station, and determine a maximum number of times of blind decoding supported by each transmission unit belonging to each transmission unit type according to the first configuration information; or a second receiving sub-module configured to receive second configuration information transmitted by the base station, and determine a maximum number of times of blind decoding supported by each transmission unit according to the second configuration information; or a third receiving sub-module configured to determine the maximum number of times of blind decoding supported by each transmission unit in a manner agreed by a system where present UE is located;

where the blind-decoding-time-number information associated with the control resource set attribute information includes the maximum number of times of blind decoding supported by each transmission unit.

In an example, the acquiring module further includes:

a first receiving and acquiring sub-module configured to receive third configuration information transmitted by the base station, and acquire a number of control resource sets on each transmission unit according to the third configuration information, where the third configuration information includes the number of control resource sets corresponding to each transmission unit, and the control resource set attribute information includes the number of control resource sets; and the determining module is configured to equally allocate the maximum number of times of blind decoding supported by each transmission unit to each control resource set corresponding to the transmission unit according to the number of control resource sets acquired by the first receiving and acquiring sub-module, so as to acquire the maximum number of times of blind decoding the schedule signaling on each control resource set.

In an example, the acquiring module further includes:

a second receiving and acquiring sub-module configured to receive fourth configuration information transmitted by the base station, and acquire a size of each control resource set on each transmission unit according to the fourth configuration information, where the fourth configuration information includes the size of each control resource set corresponding to each transmission unit, and the control resource set attribute information includes the size of the control resource set; and the determining module is configured to allocate the maximum number of times of blind decoding supported by each transmission unit to corresponding control resource sets corresponding to the transmission unit according to the size of each control resource set acquired by the second receiving and acquiring sub-module, so as to acquire the maximum number of times of blind decoding the schedule signaling on each control resource set.

In an example, the acquiring module includes:

a third receiving and acquiring sub-module configured to receive fifth configuration information transmitted by a base station, and acquire an aggregation level supported by each control resource set on each transmission unit and a maximum number of times of blind decoding the schedule signaling corresponding to each aggregation level according to the fifth configuration information, where the fifth configuration information includes the aggregation level supported by each control resource set and the maximum number of times of blind decoding the schedule signaling corresponding to each aggregation level, the control resource set attribute information includes the aggregation level supported by each control resource set, and the blind-decoding-time-number information associated with the control resource set attribute information includes the maximum number of times of blind decoding the schedule signaling corresponding to each aggregation level; or a fourth acquiring sub-module configured to acquire the aggregation level supported by each control resource set on each transmission unit in a manner agreed by a system where present UE is located, where the control resource set attribute information includes the aggregation level supported by each control resource set, and the blind-decoding-time-number information associated with the control resource set attribute information includes the maximum number of times of blind decoding the schedule signaling corresponding to each aggregation level; and the determining module is configured to determine the maximum number of times of blind decoding the schedule signaling on each control resource set according to the aggregation level supported by each control resource set on each transmission unit and the maximum number of times of blind decoding the schedule signaling corresponding to each aggregation level which are acquired by the third receiving and acquiring sub-module or the fourth acquiring sub-module.

In an example, the determining module is configured to calculate a sum of the maximum numbers of times of blind decoding the schedule signaling corresponding to respective ones of all the aggregation levels supported by each control resource set, and take a product of the calculated sum times of blind decoding and a number of types of the schedule signaling as the maximum number of times of blind decoding the schedule signaling corresponding to the control resource set.

In an example, the first configuration information, the second configuration information, the third configuration information, the fourth configuration information, or the fifth configuration information is carried in a system message, RRC signaling, a MAC CE or physical layer signaling.

According to a fourth aspect of examples of the present disclosure, there is provided an apparatus for determining a number of times of blind decoding schedule signaling. The apparatus includes:

a determining module configured to determine that a control resource set exists in at least one transmission unit of UE; and a transmitting module configured to transmit control resource set attribute information on each transmission unit to the UE, and transmit blind-decoding-time-number information associated with the control resource set attribute information to the UE, for the UE to determine a maximum number of times of blind decoding schedule signaling on each control resource set according to the control resource set attribute information and the blind-decoding-time-number information associated with the control resource set attribute information.

In an example, the transmitting module is configured to transmit first configuration information to the UE, for the UE to determine a maximum number of times of blind decoding supported by each transmission unit belonging to each transmission unit type according to the first configuration information; or transmit second configuration information to the UE, for the UE to determine a maximum number of times of blind decoding supported by each transmission unit according to the second configuration information, where the blind-decoding-time-number information associated with the control resource set attribute information includes the maximum number of times of blind decoding supported by each transmission unit.

In an example, the transmitting module is further configured to transmit third configuration information including a number of control resource sets corresponding to each transmission unit to the UE, for the UE to acquire the number of control resource sets on each transmission unit according to the third configuration information, where the control resource set attribute information includes the number of control resource sets.

In an example, the transmitting module is further configured to transmit fourth configuration information including a size of each control resource set corresponding to each transmission unit to the UE, for the UE to acquire the size of each control resource set on each transmission unit according to the fourth configuration information, where the control resource set attribute information includes the size of the control resource set.

In an example, the transmitting module is configured to transmit fifth configuration information to the UE, for the UE to acquire an aggregation level supported by each control resource set on each transmission unit and a maximum number of times of blind decoding the schedule signaling corresponding to each aggregation level according to the fifth configuration information, where the fifth configuration information includes the aggregation level supported by each control resource set and the maximum number of times of blind decoding the schedule signaling corresponding to each aggregation level, the control resource set attribute information includes the aggregation level supported by each control resource set, and the blind-decoding-time-number information associated with the control resource set attribute information includes the maximum number of times of blind decoding the schedule signaling corresponding to each aggregation level.

In an example, the first configuration information, the second configuration information, the third configuration information, the fourth configuration information, or the fifth configuration information is carried in a system message, RRC signaling, a MAC CE or physical layer signaling.

According to a fifth aspect of examples of the present disclosure, there is provided user equipment, the user equipment includes:

a processor; and a memory for storing instructions executable by the processor, where the processor is configured to:

acquire control resource set attribute information on each transmission unit, where the control resource set attribute information indicates an attribute of a control resource set corresponding to the transmission unit;

acquire blind-decoding-time-number information associated with the control resource set attribute information; and determine a maximum number of times of blind decoding schedule signaling on each control resource set according to the control resource set attribute information and the blind-decoding-time-number information associated with the control resource set attribute information.

According to a sixth aspect of examples of the present disclosure, there is provided a base station, including:

a processor; and a memory for storing instructions executable by the processor, where the processor is configured to:

determine that a control resource set exists in at least one transmission unit of UE;

and transmit control resource set attribute information on each transmission unit to the UE, and transmit blind-decoding-time-number information associated with the control resource set attribute information to the UE, for the UE to determine a maximum number of times of blind decoding schedule signaling on each control resource set according to the control resource set attribute information and the blinddecoding-time-number information associated with the control resource set attribute information.

According to a seventh aspect of examples of the present disclosure, there is provided a computer-readable storage medium storing a computer program that, when executed by a processor, causes the processor to implement the method of determining a number of times of blind decoding schedule signaling described above.

According to an eighth aspect of an example of the present disclosure, there is provided a computer-readable storage medium storing a computer program that, when executed by a processor, causes the processor to implement the method of determining a number of times of blind decoding schedule signaling described above.

The technical solutions provided by the embodiments of the present disclosure may include the following beneficial effects.

The control resource set attribute information on each transmission unit and the blind-decoding-time-number information associated with the control resource set attribute information are acquired, and the maximum number of times of blind decoding the schedule signaling on each control resource set is determined according to the acquired control resource set attribute information and blind-decoding-time-number information associated with the control resource set attribute information, so that the UE can determine the maximum number of times of blind decoding the schedule signaling on each control resource set if one or more control resource sets are configured for the UE.

The maximum number of times of blind decoding supported by each transmission unit can be determined in various ways, and the implementation is flexible and diverse.

The maximum number of times of blind decoding supported by each transmission unit and the number of control resource sets on each transmission unit are acquired, and the maximum number of times of blind decoding supported by each transmission unit is equally allocated to each control resource set corresponding to the transmission unit according to the number of control resource sets, so that the UE can determine the maximum number of times of blind decoding the schedule signaling on each control resource set if one or more control resource sets are configured for the UE.

The maximum number of times of blind decoding supported by each transmission unit and the size of each control resource set on each transmission unit are acquired, and the maximum number of times of blind decoding supported by each transmission unit is allocated to corresponding control resource set corresponding to the transmission unit according to the size of each control resource set, so that the UE can determine the maximum number of times of blind decoding the schedule signaling on each control resource set if one or more control resource sets are configured for the UE.

The aggregation level supported by each control resource set on each transmission unit and the maximum number of times of blind decoding the schedule signaling corresponding to each aggregation level can be determined in various ways, and the implementation is flexible and diverse.

The aggregation level supported by each control resource set on each transmission unit and the maximum number of times of blind decoding the schedule signaling corresponding to each aggregation level are acquired, and the maximum number of times of blind decoding the schedule signaling on each control resource set is determined according to the aggregation level supported by each control resource set and the maximum number of times of blind decoding the schedule signaling corresponding to each aggregation level, so that the UE can determine the maximum number of times of blind decoding the schedule signaling on each control resource set if one or more control resource sets are configured for the UE.

The first configuration information, the second configuration information, the third configuration information, the fourth configuration information, or the fifth configuration information is carried in a system message, RRC signaling, a MAC CE or physical layer signaling. It can facilitate the UE to acquire the corresponding configuration information, and the implementation is simple.

The control resource set attribute information on each transmission unit and the blind-decoding-time-number information associated with the control resource set attribute information are transmitted to the UE, so that the UE can determine the maximum number of times of blind decoding the schedule signaling on each control resource set according to the control resource set attribute information and the blind-decoding-time-number information associated with the control resource set attribute information. Thus, the UE can determine the maximum number of times of blind decoding the schedule signaling on each control resource set if one or more control resource sets are configured for the UE.

The first configuration information and the second configuration information are transmitted to the UE, so that the UE can determine the maximum number of times of blind decoding supported by each transmission unit. The implementation is flexible and diverse.

The first and third configuration information are transmitted to the UE, so that the UE can acquire the maximum number of times of blind decoding supported by each transmission unit and the number of control resource sets on each transmission unit, based on which the UE can determine the maximum number of times of blind decoding the schedule signaling on each control resource set.

The first and fourth configuration information are transmitted to the UE, so that the UE can acquire the maximum number of times of blind decoding supported by each transmission unit and the size of each control resource set on each transmission unit, based on which the UE can determine the maximum number of times of blind decoding the schedule signaling on each control resource set.

The fifth configuration information is transmitted to the UE, so that the UE can acquire the aggregation level supported by each control resource set on each transmission unit, based on which the UE can determine the maximum number of times of blind decoding the schedule signaling on each control resource set.

The fifth configuration information carries the maximum number of times of blind decoding the schedule signaling corresponding to each aggregation level, so that the UE can obtain the maximum number of times of blind decoding the schedule signaling corresponding to each aggregation level, based on which the UE can determine the maximum number of times of blind decoding the schedule signaling on each control resource set.

The first configuration information, the second configuration information, the third configuration information, the fourth configuration information, or the fifth configuration information is carried in a system message, RRC signaling, a MAC CE or physical layer signaling. It can facilitate the UE to acquire the corresponding configuration information, and the implementation is simple.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

Figure 1:
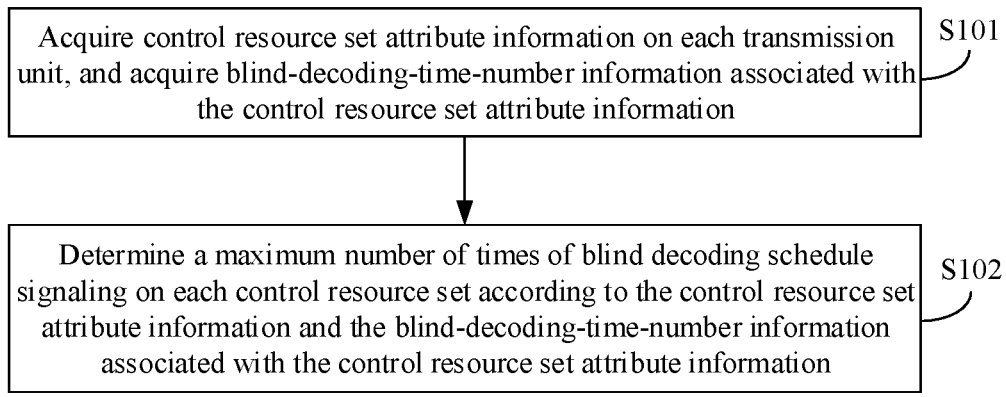
FIG. 1 is a flowchart illustrating a method of determining a number of times of blind decoding schedule signaling according to an example of the present application.

It is to be understood that the above general descriptions and the below detailed descriptions are merely exemplary and explanatory, and are not intended to limit the present disclosure.

DETAILED DESCRIPTION OF THE EMBODIMENTS

Examples will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

FIG. 1 is a flowchart illustrating a method of determining a number of times of blind decoding schedule signaling according to an example of the present application. The example is described from a User Equipment (UE) side. As shown in FIG. 1, the method of determining a number of times of blind decoding schedule signaling includes steps S101-S102.

At step S101, control resource set attribute information on each transmission unit is acquired, and blind-decoding-time-number information associated with the control resource set attribute information is acquired.

The control resource set attribute information is used to indicate an attribute of a control resource set corresponding to the transmission unit, and the control resource set attribute information may include, but is not limited to, at least one of, a number of control resource sets, a size of each control resource set, or an aggregation level supported by each control resource set. The blind-decoding-time-number information associated with the control resource set attribute information may include, but is not limited to, a maximum number of times of blind decoding supported by each transmission unit or a maximum number of times of blind decoding schedule signaling corresponding to each aggregation level.

At step S102, a maximum number of times of blind decoding schedule signaling on each control resource set is determined according to the acquired control resource set attribute information and the acquired blind-decoding-time-number information associated with the control resource set attribute information.

In the example, if the acquired control resource set attribute information is the aggregation level supported by the control resource set, and if the acquired blind-decoding-time-number information associated with the control resource set attribute information is the maximum number of times of blind decoding the schedule signaling corresponding to each aggregation level, the maximum number of times of blind decoding the schedule signaling on each control resource set may be determined according to the aggregation level supported by each control resource set on each transmission unit and the maximum number of times of blind decoding the schedule signaling corresponding to each aggregation level.

In the example, the control resource set attribute information on each transmission unit and the blind-decoding-time-number information associated with the control resource set attribute information are acquired, and the maximum number of times of blind decoding the schedule signaling on each control resource set is determined according to the acquired control resource set attribute information and the acquired blind-decoding-time-number information associated with the control resource set attribute information, so that the UE can determine the maximum number of times of blind decoding the schedule signaling on each control resource set in a case that one or more control resource sets are configured for the UE.

Figure 2A:
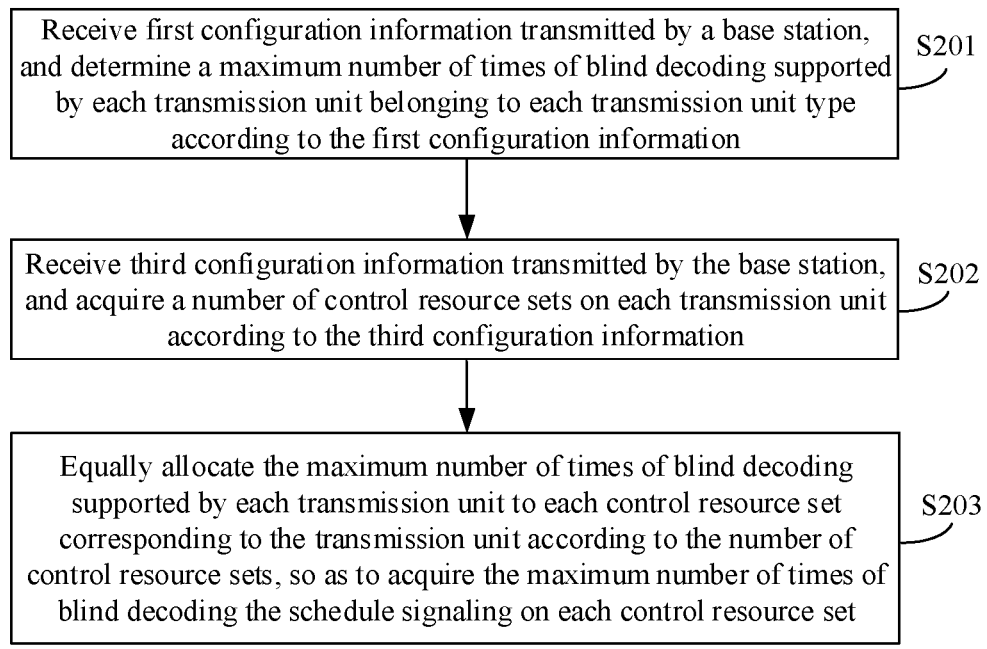
FIG. 2A is a flowchart illustrating another method of determining a number of times of blind decoding schedule signaling according to an example of the present application.

FIG. 2A is a flowchart illustrating another method of determining a number of times of blind decoding schedule signaling according to an example of the present application. As shown in FIG. 2A, the method of determining a number of times of blind decoding schedule signaling may include steps S201-S203.

At step S201, first configuration information transmitted by a base station is received, and a maximum number of times of blind decoding supported by each transmission unit belonging to each transmission unit type is determined according to the first configuration information.

The transmission unit type may include, but is not limited to, a slot-based type of transmission unit and a symbol-based type of transmission unit. For scenarios that may support multiple transmission unit types, the base station can configure the maximum number of times of blind decoding for each transmission unit type. For example, for the slot-based type of transmission unit and the symbol-based type of transmission unit, the base station may respectively notify the corresponding terminal of the maximum number of times of blind decoding for each transmission unit type through a system message, Radio Resource Control (RRC) signaling, a Medium Access Control (MAC) Control Element (CE) or physical layer signaling that carries the first configuration information.

In the example, after the maximum number of times of blind decoding for each transmission unit type is determined, the maximum number of times of blind decoding supported by each transmission unit belonging to each transmission unit type can be determined.

In addition, the UE may also obtain the maximum number of times of blind decoding supported by each transmission unit through other means. For example, the UE may receive second configuration information transmitted by the base station, and determine the maximum number of times of blind decoding supported by each transmission unit according to the second configuration information. The number of times of blind decoding supported by each transmission unit may also be determined in a manner agreed by a system where the present UE is located.

The difference between the first configuration information and the second configuration information is that the first configuration information can be used to determine the maximum number of times of blind decoding supported by one or more transmission unit types, while the second configuration information can only be used to determine the maximum number of times of blind decoding supported by one transmission unit type.

The second configuration information may be carried in the system message, the RRC signaling, the MAC CE, or the physical layer signaling.

At step S202, third configuration information transmitted by the base station is received, and a number of control resource sets on each transmission unit is acquired according to the third configuration information.

The third configuration information includes a number of control resource sets corresponding to each transmission unit, and the third configuration information may also be carried in the system message, the RRC signaling, the MAC CE, or the physical layer signaling.

In addition, the third configuration information may further include time-frequency resource location information and beam information of each control resource set, so as to determine a location of the control resource set.

At step S203, according to the number of control resource sets, the maximum number of times of blind decoding supported by each transmission unit is equally allocated to each control resource set corresponding to the transmission unit, so as to acquire the maximum number of times of blind decoding schedule signaling on each control resource set.

It is assumed that the UE determines that the maximum number of times of blind decoding supported by each transmission unit is N, and the number of control resource sets in a current transmission unit is M, then the maximum number of times of blind decoding the schedule signaling on each control resource set on the transmission unit is N/M. It should be noted that each control resource set may have the same size or different sizes of control resource.

Figure 2B:
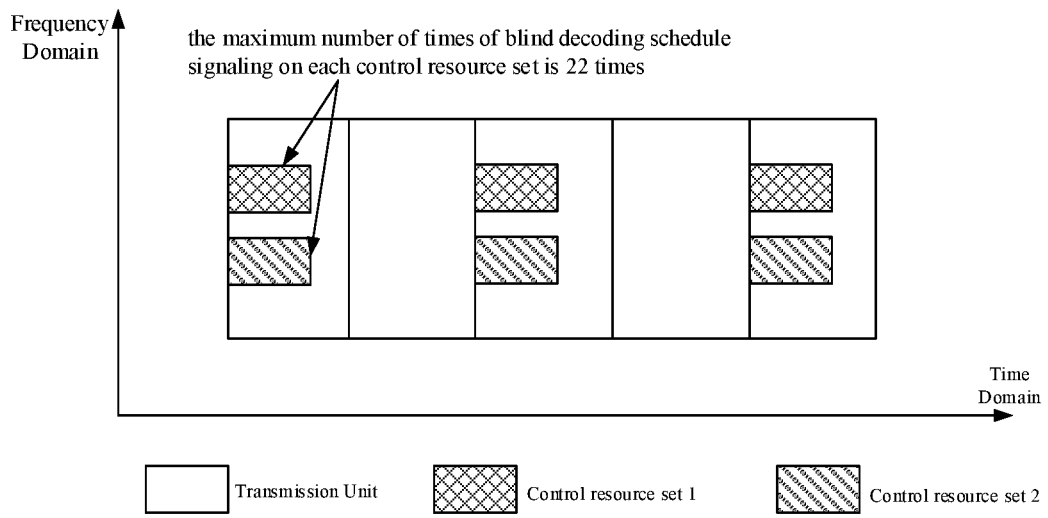
FIG. 2B is a schematic diagram illustrating a transmission unit including control resource sets according to an example of the present application.

For example, as shown in FIG. 2B, it is assumed that the UE determines that the maximum number of times of blind decoding supported by one transmission unit is 44 times in a manner agreed by the system (a predefined manner), and the transmission unit is a slot in the time domain, that is, the transmission unit is described by taking a slot-based type of transmission unit as an example. When two control resource sets are configured on the transmission unit, the maximum number of times of blind decoding the schedule signaling on each control resource set is 22 times.

Figure 2C:
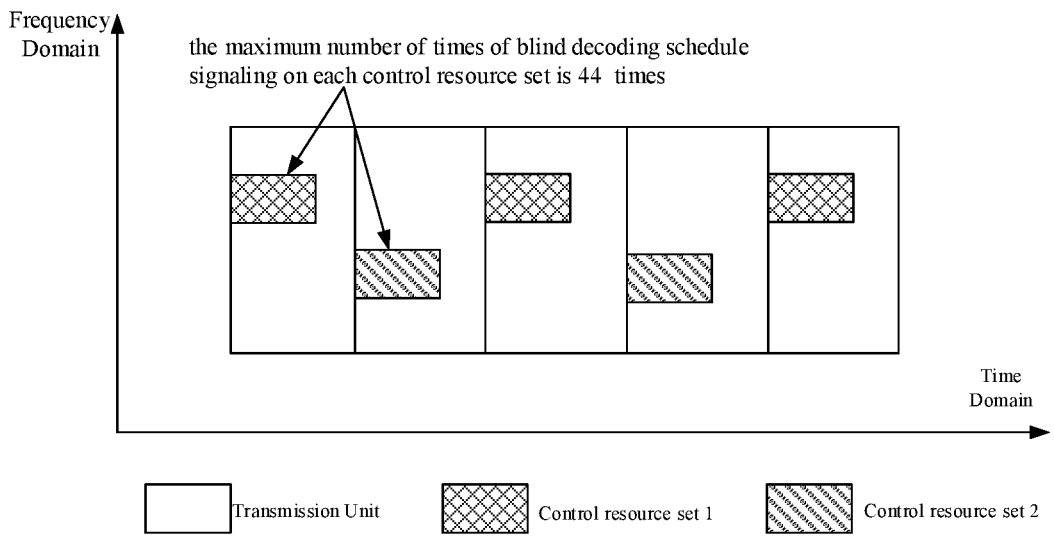
FIG. 2C is a schematic diagram illustrating another transmission unit including control resource sets according to an example of the present application.

For another example, as shown in FIG. 2C, it is assumed that the UE determines that the maximum number of times of blind decoding supported by one transmission unit is 44 times in a predefined manner, and the transmission unit is a slot in the time domain, that is, the transmission unit is described by taking a slot-based type of transmission unit as an example. When one control resource set is configured on the transmission unit, the maximum number of times of blind decoding the schedule signaling on each control resource set is 44 times.

In the example, the maximum number of times of blind decoding supported by each transmission unit and the number of control resource sets on each transmission unit are acquired, and the maximum number of times of blind decoding supported by each transmission unit is equally allocated to each control resource set corresponding to the transmission unit according to the number of control resource sets, so that the UE can determine the maximum number of times of blind decoding the schedule signaling on each control resource set in a case that one or more control resource sets are configured for the UE.

Figure 3:
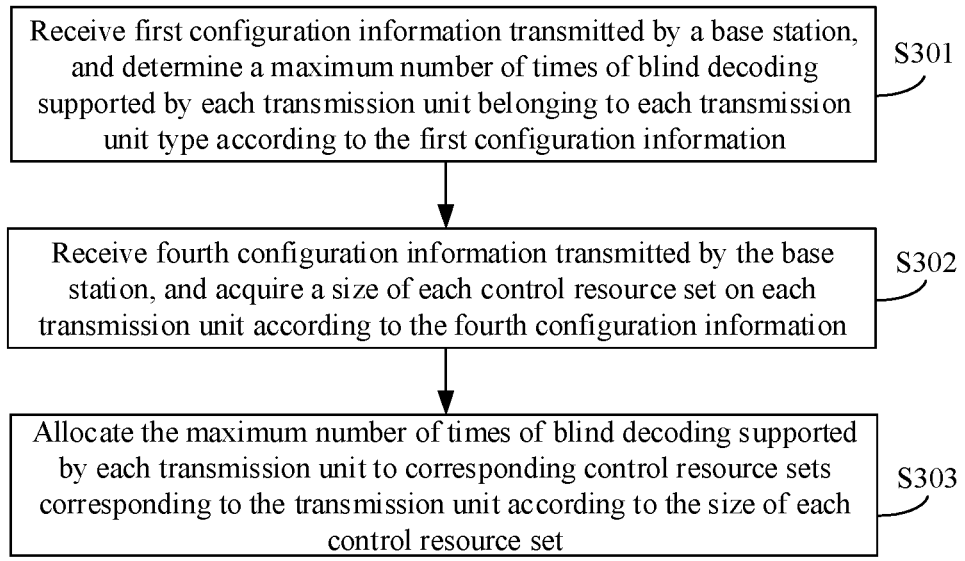
FIG. 3 is a flowchart illustrating another method of determining a number of times of blind decoding schedule signaling according to an example of the present application.

FIG. 3 is a flowchart illustrating another method of determining a number of times of blind decoding schedule signaling according to an example of the present application. As shown in FIG. 3, the method of determining a number of times of blind decoding schedule signaling may include steps S301-S303.

At step S301, first configuration information transmitted by a base station is received, and a maximum number of times of blind decoding supported by each transmission unit belonging to each transmission unit type is determined according to the first configuration information.

The transmission unit type may include, but is not limited to, a slot-based type of transmission unit and a symbol-based type of transmission unit. For scenarios that may support multiple transmission unit types, the base station can configure the maximum number of times of blind decoding for each transmission unit type. For example, for the slot-based type of transmission unit and the symbol-based type of transmission unit, the base station may respectively notify the corresponding UE of the maximum number of times of blind decoding for each transmission unit type through a system message, RRC signaling, and a MAC CE or physical layer signaling that carries the first configuration information.

In the example, after the maximum number of times of blind decoding for each transmission unit type is determined, the maximum number of times of blind decoding supported by each transmission unit belonging to each transmission unit type can be determined.

In addition, the UE may also obtain the maximum number of times of blind decoding supported by each transmission unit through other means. For example, the UE may receive second configuration information transmitted by the base station, and determine the maximum number of times of blind decoding supported by each transmission unit according to the second configuration information. The number of times of blind decoding supported by each transmission unit may also be determined in a manner agreed by a system where the present UE is located.

The second configuration information may be carried in the system message, the RRC signaling, the MAC CE, or the physical layer signaling.

At step S302, fourth configuration information transmitted by the base station is received, and a size of each control resource set on each transmission unit is acquired according to the fourth configuration information.

The fourth configuration information may include a size of each control resource set corresponding to each transmission unit, and the fourth configuration information may also be carried in the system message, the RRC signaling, the MAC CE, or the physical layer signaling.

In addition, the fourth configuration information may further include time-frequency resource location information and beam information of each control resource set, so as to determine a location of the control resource set.

At step S303, according to the size of each control resource set, the maximum number of times of blind decoding supported by each transmission unit is allocated to a corresponding control resource set corresponding to the transmission unit, so as to acquire the maximum number of times of blind decoding the schedule signaling on each control resource set.

In the example, the number of times of blind decoding on each control resource set is proportional to the size of the control resource set. It is assumed that control resource set 1 and control resource set 2 are the same in time lengths and a size of control resource set 1 is twice that of control resource set 2 in the frequency domain, the maximum number of times of blind decoding on control resource set 1 is twice the maximum number of times of blind decoding on control resource set 2, meanwhile the sum of the two cannot exceed the maximum number of times of blind decoding supported by the transmission unit. For example, if one transmission unit includes control resource set 1 and control resource set 2, where a size of control resource set 1 is three times that of control resource set 2, and the maximum number of times of blind decoding supported by the transmission unit is 44 times, the maximum number of times of blind decoding the schedule signaling on control resource set 1 is 33, and the maximum number of times of blind decoding the schedule signaling on control resource set 2 is 11.

In the example, the maximum number of times of blind decoding supported by each transmission unit and the size of each control resource set on each transmission unit are acquired, and the maximum number of times of blind decoding supported by each transmission unit is allocated to the corresponding control resource set corresponding to the transmission unit according to the size of each control resource set, so that the UE can determine the maximum number of times of blind decoding the schedule signaling on each control resource set in a case that one or more control resource sets are configured for the UE.

Figure 4:
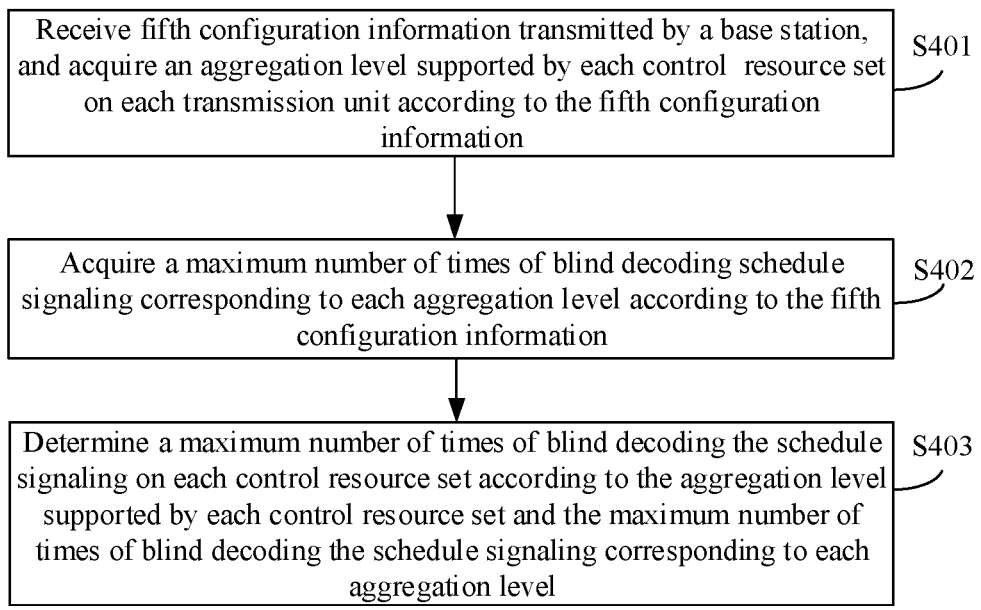
FIG. 4 is a flowchart illustrating another method of determining a number of times of blind decoding schedule signaling according to an example of the present application.

FIG. 4 is a flowchart illustrating another method of determining a number of times of blind decoding schedule signaling according to an example of the present application. As shown in FIG. 4, the method of determining a number of times of blind decoding schedule signaling may include steps S401-S403.

At step S401, fifth configuration information transmitted by a base station is received, and an aggregation level supported by each control resource set on each transmission unit is acquired according to the fifth configuration information.

The fifth configuration information may include an aggregation level supported by each control resource set, and the fifth configuration information may be carried in a system message, RRC signaling, a MAC CE, or physical layer signaling.

It should be noted that the fifth configuration information may further include time-frequency resource location information and beam information of each control resource set, so as to determine the location of the control resource set.

In the example, the base station may transmit schedule signaling to UE with different aggregation levels. Thus, the UE needs to acquire the aggregation level supported by each control resource set.

In addition, the UE may also acquire the aggregation level supported by each control resource set on each transmission unit in a manner agreed by a system where the present UE is located.

At step S402, a maximum number of times of blind decoding schedule signaling corresponding to each aggregation level is acquired according to the fifth configuration information.

It is assumed that the UE needs to perform 6 times of decoding schedule signaling with aggregation level 1, 6 times of decoding schedule signaling with aggregation level 2, 2 times of decoding schedule signaling with aggregation level 4, and 2 times of decoding schedule signaling with aggregation level 8. At step S403, a maximum number of times of blind decoding the schedule signaling on each control resource set is determined according to the aggregation level supported by each control resource set and the maximum number of times of blind decoding the schedule signaling corresponding to each aggregation level.

In the example, a sum of the maximum numbers of times of blind decoding the schedule signaling corresponding to respective ones of all the aggregation levels supported by each control resource set may be calculated, and a product of the calculated sum of the maximum numbers of times of blind decoding the schedule signaling and a number of types of the schedule signaling may be taken as the maximum number of times of blind decoding the schedule signaling corresponding to the control resource set.

The number of the types of the schedule signaling may be determined according to the length of the control information carried in the schedule signaling. For example, if for each aggregation level, it has to decode scheduling signaling having control information with two types of lengths, the number of the types of the schedule signaling is 2.

It is assumed that the base station configures the UE as only supporting schedule signaling transmission at aggregation levels 1 and 2 on control resource set 1, only supporting schedule signaling transmission at aggregation levels 4 and 8 on control resource set 2, and the number of the types of the schedule signaling is 2, then the UE has a maximum number of times of blind decoding on control resource set 1 being 24 times, and a maximum number of times of blind decoding on control resource set 2 being 8 times.

In the example, the aggregation level supported by each control resource set and the maximum number of times of blind decoding the schedule signaling corresponding to each aggregation level are acquired, and the maximum number of times of blind decoding the schedule signaling on each control resource set is determined according to the aggregation level supported by each control resource set and the maximum number of times of blind decoding the schedule signaling corresponding to each aggregation level, so that the UE can determine the maximum number of times of blind decoding the schedule signaling on each control resource set in a case that one or more control resource sets are configured for the UE.

Figure 5:
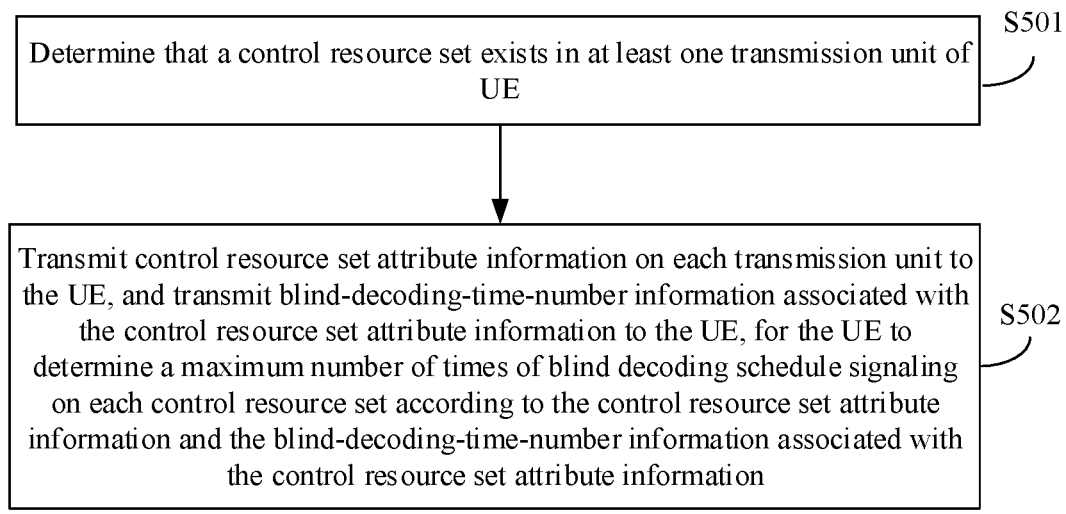
FIG. 5 is a flowchart illustrating still another method of determining a number of times of blind decoding schedule signaling according to an example of the present application.

FIG. 5 is a flowchart illustrating still another method of determining a number of times of blind decoding schedule signaling according to an example of the present application. The example is described from a base station side, and as shown in FIG. 5, the method of determining a number of times of blind decoding schedule signaling includes steps S501-S502.

At step S501, it is determined that a control resource set exists in at least one transmission unit of UE.

At step S502, control resource set attribute information on each transmission unit is transmitted to the UE, and blind-decoding-time-number information associated with the control resource set attribute information is transmitted to the UE, for the UE to determine a maximum number of times of blind decoding schedule signaling on each control resource set according to the control resource set attribute information and the blind-decoding-time-number information associated with the control resource set attribute information.

After the base station determines that a control resource set exists in at least one transmission unit of the UE, the base station transmits control resource set attribute information on each transmission unit and blind-decoding-time-number information associated with the control resource set attribute information to the UE. The control resource set attribute information may include, but is not limited to, at least one of, a number of control resource sets, a size of each control resource set, or an aggregation level supported by each control resource set. The blind-decoding-time-number information associated with the control resource set attribute information may include, but is not limited to, a maximum number of times of blind decoding supported by each transmission unit or a maximum number of times of blind decoding the schedule signaling corresponding to each aggregation level.

In the example, the control resource set attribute information on each transmission unit and the blind-decoding-time-number information associated with the control resource set attribute information are transmitted to the UE, so that the UE can determine the maximum number of times of blind decoding the schedule signaling on each control resource set according to the control resource set attribute information and the blind-decoding-time-number information associated with the control resource set attribute information. Thus, the UE can determine the maximum number of times of blind decoding the schedule signaling on each control resource set in a case that one or more control resource sets are configured for the UE.

Figure 6:
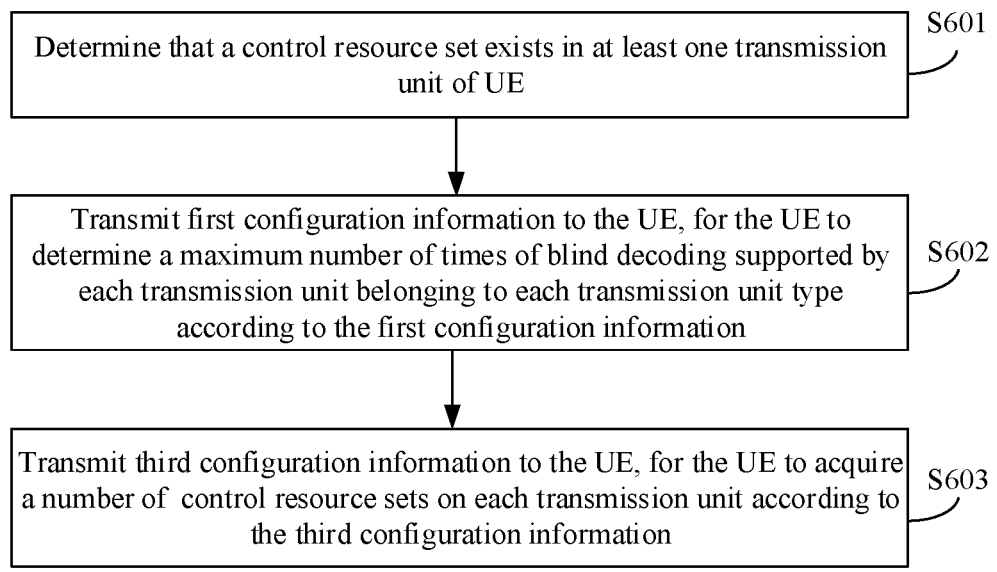
FIG. 6 is a flowchart illustrating yet another method of determining a number of times of blind decoding schedule signaling according to an example of the present application.

FIG. 6 is a flowchart illustrating yet another method of determining a number of times of blind decoding schedule signaling according to an example of the present application. As shown in FIG. 6, the method of determining a number of times of blind decoding schedule signaling includes step S601-S603.

At step S601, it is determined that a control resource set exists in at least one transmission unit of UE.

At step S602, first configuration information is transmitted to the UE, for the UE to determine a maximum number of times of blind decoding supported by each transmission unit belonging to each transmission unit type according to the first configuration information.

The base station may further transmit second configuration information to the UE, so that the UE may determine a maximum number of times of blind decoding supported by each transmission unit according to the second configuration information.

The first configuration information or the second configuration information may be carried in a system message, RRC signaling, a MAC CE, or physical layer signaling. The difference between the first configuration information and the second configuration information is that the first configuration information can be used to determine the maximum number of times of blind decoding supported by one or more transmission unit types, while the second configuration information can only be used to determine the maximum number of times of blind decoding supported by one transmission unit type.

At step S603, third configuration information is transmitted to the UE, for the UE to acquire a number of control resource sets on each transmission unit according to the third configuration information.

The third configuration information can include the number of control resource sets corresponding to each transmission unit. The third configuration information may also be carried in the system message, the RRC signaling, the MAC CE, or the physical layer signaling.

In addition, the third configuration information may further include time-frequency resource location information and beam information of each control resource set, so as to determine a location of the control resource set by the UE.

In the example, the first and third configuration information are transmitted to the UE, so that the UE can acquire the maximum number of times of blind decoding supported by each transmission unit and the number of control resource sets on each transmission unit, based on which the UE can determine the maximum number of times of blind decoding schedule signaling on each control resource set.

Figure 7:
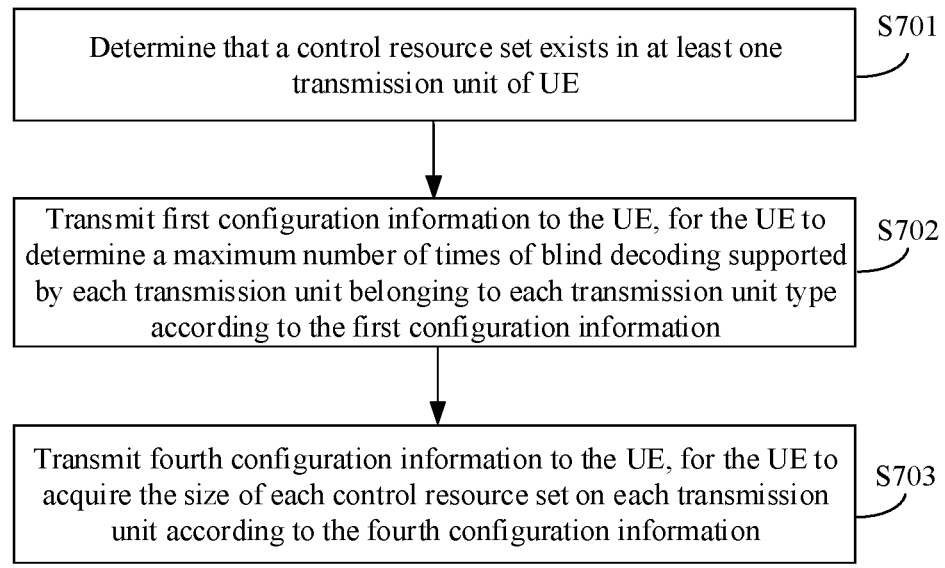
FIG. 7 is a flowchart illustrating yet another method of determining a number of times of blind decoding schedule signaling according to an example of the present application.

FIG. 7 is a flowchart illustrating yet another method of determining a number of times of blind decoding schedule signaling according to an example of the present application. As shown in FIG. 7, the method of determining a number of times of blind decoding schedule signaling includes step S701-S703.

At step S701, it is determined that a control resource set exists in at least one transmission unit of UE.

At step S702, first configuration information is transmitted to the UE, for the UE to determine a maximum number of times of blind decoding supported by each transmission unit belonging to each transmission unit type according to the first configuration information.

The base station may further transmit second configuration information to the UE, so that the UE may determine a maximum number of times of blind decoding supported by each transmission unit according to the second configuration information.

The first configuration information or the second configuration information may be carried in a system message, RRC signaling, a MAC CE, or physical layer signaling.

At step S703, fourth configuration information is transmitted to the UE, for the UE to acquire a size of each control resource set on each transmission unit according to the fourth configuration information.

The fourth configuration information includes a size of each control resource set corresponding to each transmission unit. The fourth configuration information may also be carried in the system message, the RRC signaling, the MAC CE, or the physical layer signaling.

In addition, the fourth configuration information may further include time-frequency resource location information and beam information of each control resource set, so as to determine a location of the control resource set by the UE.

In the example, the first configuration information and the fourth configuration information are transmitted to the UE, so that the UE can acquire the maximum number of times of blind decoding supported by each transmission unit and the size of each control resource set on each transmission unit, based on which the UE can determine the maximum number of times of blind decoding schedule signaling on each control resource set.

Figure 8:
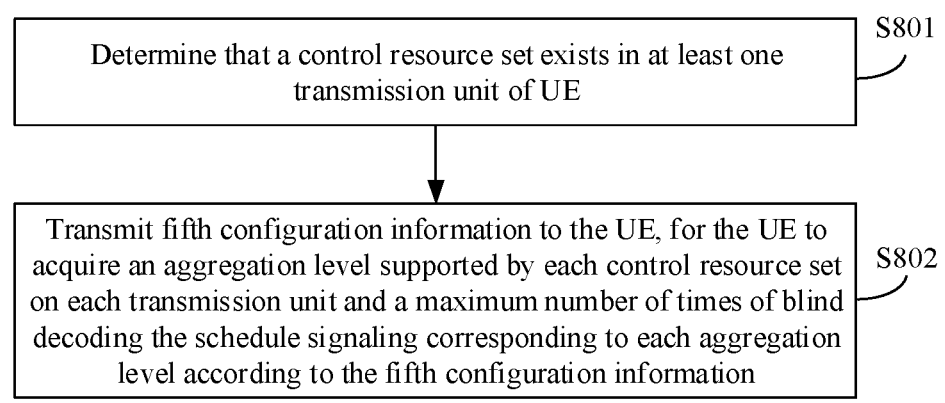
FIG. 8 is a flowchart illustrating yet another method of determining a number of times of blind decoding schedule signaling according to an example of the present application.

FIG. 8 is a flowchart illustrating yet another method of determining a number of times of blind decoding schedule signaling according to an example of the present application. As shown in FIG. 8, the method of determining a number of times of blind decoding schedule signaling includes step S801-S802.

At step S801, it is determined that a control resource set exists in at least one transmission unit of UE.

At step S802, fifth configuration information is transmitted to the UE, for the UE to acquire an aggregation level supported by each control resource set on each transmission unit and a maximum number of times of blind decoding schedule signaling corresponding to each aggregation level according to the fifth configuration information.

The fifth configuration information includes an aggregation level supported by each control resource set, and may also include a maximum number of times of blind decoding schedule signaling corresponding to each aggregation level. The fifth configuration information may be carried in a system message, RRC signaling, a MAC CE, or physical layer signaling.

It should be noted that the fifth configuration information may further include time-frequency resource location information and beam information of each control resource set, so as to determine the location of the control resource set by the UE.

In the example, the fifth configuration information is transmitted to the UE, so that the UE can acquire the aggregation level supported by each control resource set on each transmission unit and the maximum number of times of blind decoding the schedule signaling corresponding to each aggregation level, based on which the UE can determine the maximum number of times of blind decoding the schedule signaling on each control resource set.

Figure 9:
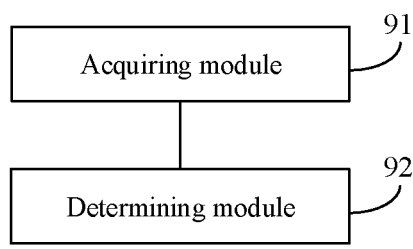
FIG. 9 is a block diagram illustrating an apparatus for determining a number of times of blind decoding schedule signaling according to an example.

FIG. 9 is a block diagram illustrating an apparatus for determining a number of times of blind decoding schedule signaling according to an example. As shown in FIG. 9, the apparatus for determining a number of times of blind decoding schedule signaling includes: an acquiring module 91 and a determining module 92.

The acquiring module 91 is configured to acquire control resource set attribute information on each transmission unit, and acquire blind-decoding-time-number information associated with the control resource set attribute information, where the control resource set attribute information indicates an attribute of a control resource set corresponding to the transmission unit.

The control resource set attribute information may include, but is not limited to, at least one of, a number of control resource sets, a size of each control resource set, or an aggregation level supported by each control resource set. The blind-decoding-time-number information associated with the control resource set attribute information may include, but is not limited to, a maximum number of times of blind decoding supported by each transmission unit or a maximum number of times of blind decoding schedule signaling corresponding to each aggregation level.

The determining module 92 is configured to determine a maximum number of times of blind decoding schedule signaling on each control resource set according to the control resource set attribute information and the blind-decoding-time-number information associated with the control resource set attribute information which are acquired by the acquiring module 91.

In the example, if the acquired control resource set attribute information is the aggregation level supported by the control resource set, and if the acquired blind-decoding-time-number information associated with the control resource set attribute information is the maximum number of times of blind decoding the schedule signaling corresponding to each aggregation level, the maximum number of times of blind decoding the schedule signaling on each control resource set may be determined according to the aggregation level supported by each control resource set on each transmission unit and the maximum number of times of blind decoding the schedule signaling corresponding to each aggregation level.

In the example, the control resource set attribute information on each transmission unit and the blind-decoding-time-number information associated with the control resource set attribute information are acquired, and the maximum number of times of blind decoding the schedule signaling on each control resource set is determined according to the acquired control resource set attribute information and the acquired blind-decoding-time-number information associated with the control resource set attribute information, so that the UE can determine the maximum number of times of blind decoding the schedule signaling on each control resource set in a case that one or more control resource sets are configured for the UE.

Figure 10A:
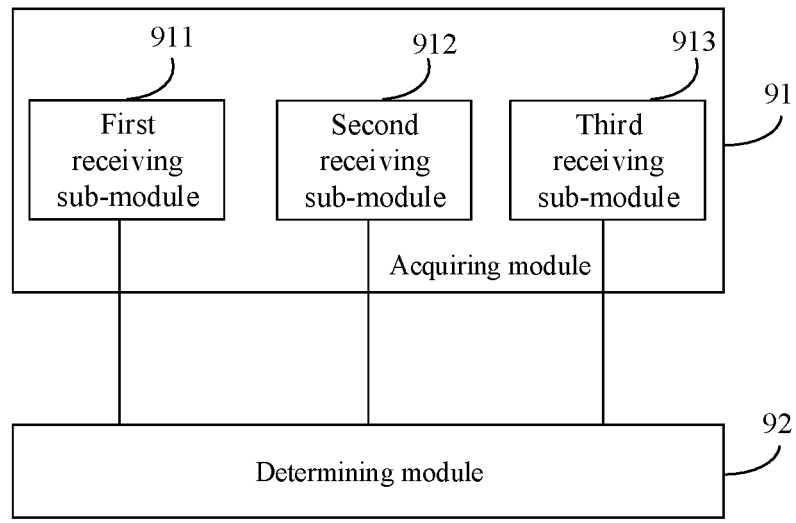
FIG. 10A is a block diagram illustrating another apparatus for determining a number of times of blind decoding schedule signaling according to an example.

FIG. 10A is a block diagram illustrating another apparatus for determining a number of times of blind decoding schedule signaling according to an example. As shown in FIG. 10A, on the basis of the example shown in FIG. 9, the acquiring module 91 may include at least one of a first receiving sub-module 911, a second receiving sub-module 912, and a third receiving sub-module 913.

The first receiving sub-module 911 is configured to receive first configuration information transmitted by a base station, and determine a maximum number of times of blind decoding supported by each transmission unit belonging to each transmission unit type according to the first configuration information.

The transmission unit type may include, but is not limited to, a slot-based type of transmission unit and a symbol-based type of transmission unit. For scenarios that may support multiple transmission unit types, the base station can configure the maximum number of times of blind decoding for each transmission unit type. For example, for the slot-based type of transmission unit and the symbol-based type of transmission unit, the base station may respectively notify the corresponding terminal of the maximum number of times of blind decoding for each transmission unit type through a system message, RRC signaling, a MAC CE or physical layer signaling that carries the first configuration information.

The second receiving sub-module 912 is configured to receive second configuration information transmitted by the base station, and determine a maximum number of times of blind decoding supported by each transmission unit according to the second configuration information.

The first receiving sub-module 913 is configured to determine the maximum number of times of blind decoding supported by each transmission unit in a manner agreed by a system where present UE is located.

In addition, the UE may also obtain the maximum number of times of blind decoding supported by each transmission unit through other means. For example, the UE may receive second configuration information transmitted by the base station, and determine the maximum number of times of blind decoding supported by each transmission unit according to the second configuration information. The number of times of blind decoding supported by each transmission unit may also be determined in a manner agreed by a system where the present UE is located.

The second configuration information may be carried in the system message, the RRC signaling, the MAC CE, or the physical layer signaling.

In the example, the maximum number of times of blind decoding supported by each transmission unit can be determined in various ways, and the implementation is flexible and diverse.

Figure 10B:
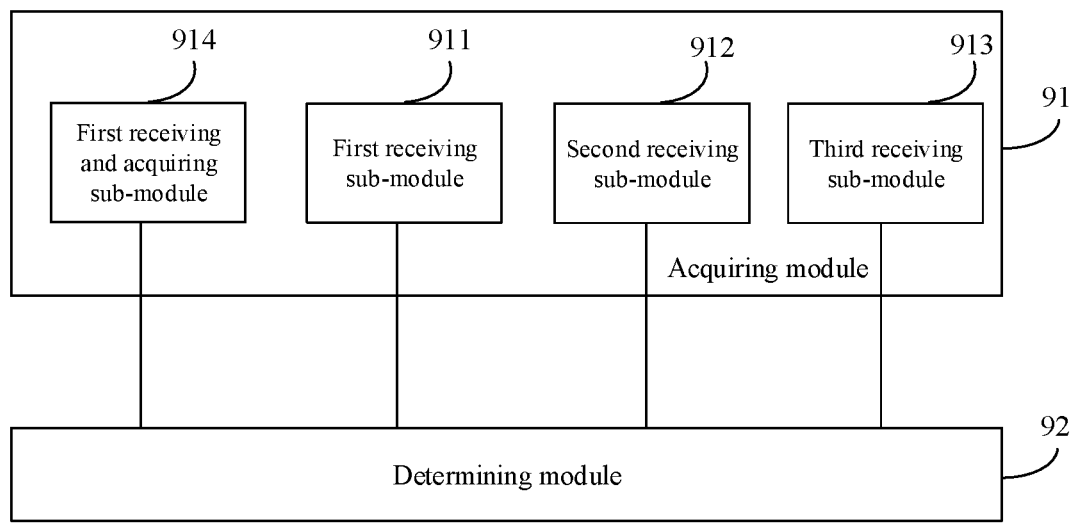
FIG. 10B is a block diagram illustrating another apparatus for determining a number of times of blind decoding schedule signaling according to an example.

FIG. 10B is a block diagram of another apparatus for determining a number of times of blind decoding schedule signaling according to an example. As shown in FIG. 10B, on the basis of the example shown in FIG. 10A, the acquiring module 91 may also include a first receiving and acquiring sub-module 914.

The first receiving and acquiring sub-module 914 is configured to receive third configuration information transmitted by the base station, acquire a number of control resource sets on each transmission unit according to the third configuration information, and take the third configuration information as the control resource set attribute information, where the third configuration information includes the number of control resource sets corresponding to each transmission unit.

The third configuration information includes a number of control resource sets corresponding to each transmission unit, and the third configuration information may also be carried in the system message, the RRC signaling, the MAC CE, or the physical layer signaling.

The determining module 92 may be configured to, according to the number of control resource sets, equally allocate the maximum number of times of blind decoding supported by each transmission unit to each control resource set corresponding to the transmission unit, so as to acquire the maximum number of times of blind decoding the schedule signaling on each control resource set.

It is assumed that the UE determines that the maximum number of times of blind decoding supported by each transmission unit is N, and the number of control resource sets in a current transmission unit is M, then the maximum number of times of blind decoding the schedule signaling on each control resource set on the transmission unit is N/M. It should be noted that each control resource set may have the same size or different sizes of control resource.

For example, as shown in FIG. 2B, it is assumed that the UE determines that the maximum number of times of blind decoding supported by one transmission unit is 44 times in a predefined manner, and the transmission unit is a slot in the time domain, that is, the transmission unit is described by taking a slot-based type of transmission unit as an example. When two control resource sets are configured on the transmission unit, the maximum number of times of blind decoding the schedule signaling on each control resource set is 22 times.

For another example, as shown in FIG. 2C, it is assumed that the UE determines that the maximum number of times of blind decoding supported by one transmission unit is 44 times in a predefined manner, and the transmission unit is a slot in the time domain, that is, the transmission unit is described by taking a slot-based type of transmission unit as an example. When one control resource set is configured on the transmission unit, the maximum number of times of blind decoding the schedule signaling on each control resource set is 44 times.

In the example, the maximum number of times of blind decoding supported by each transmission unit and the number of control resource sets on each transmission unit are acquired, and the maximum number of times of blind decoding supported by each transmission unit is equally allocated to each control resource set corresponding to the transmission unit according to the number of control resource sets, so that the UE can determine the maximum number of times of blind decoding the schedule signaling on each control resource set in a case that one or more control resource sets are configured for the UE.

Figure 10C:
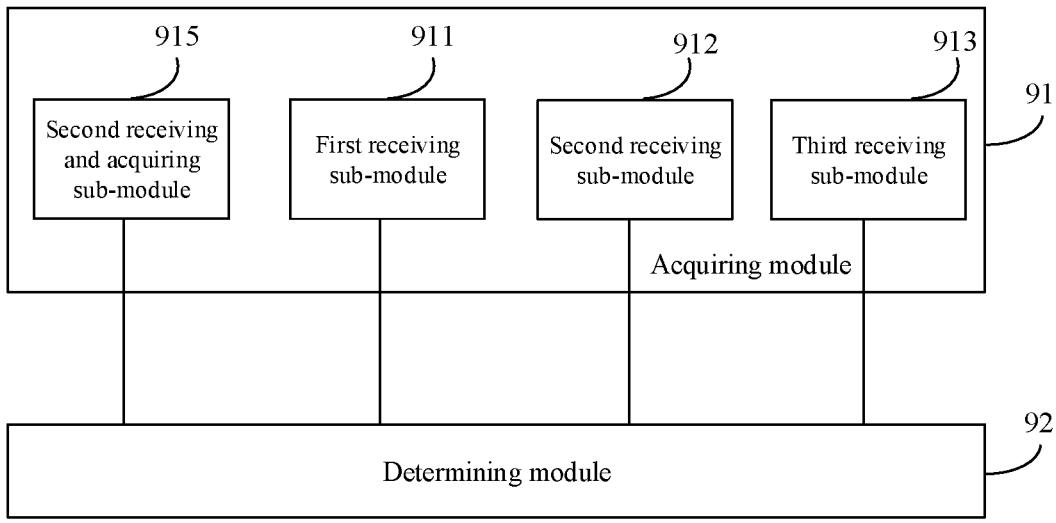
FIG. 10C is a block diagram illustrating another apparatus for determining a number of times of blind decoding schedule signaling according to an example.

FIG. 10C is a block diagram illustrating another apparatus for determining a number of times of blind decoding schedule signaling according to an example. As shown in FIG. 10C, on the basis of the example shown in FIG. 10A, the acquiring module 91 may also include a second receiving and acquiring sub-module 915.

The second receiving and acquiring sub-module 915 is configured to receive fourth configuration information transmitted by the base station, acquire a size of each control resource set on each transmission unit according to the fourth configuration information, and take the fourth configuration information as the control resource set attribute information, where the fourth configuration information includes the size of each control resource set corresponding to each transmission unit.

The fourth configuration information may include a size of each control resource set corresponding to each transmission unit, and the fourth configuration information may also be carried in the system message, the RRC signaling, the MAC CE, or the physical layer signaling.

The determining module 92 may be configured to allocate the maximum number of times of blind decoding supported by each transmission unit to corresponding control resource sets corresponding to the transmission unit according to the size of each control resource set.

In the example, the number of times of blind decoding on each control resource set is proportional to the size of the control resource set. It is assumed that control resource set 1 and control resource set 2 are the same in time lengths and a size of control resource set 1 is twice that of control resource set 2 in the frequency domain, the maximum number of times of blind decoding on control resource set 1 is twice the maximum number of times of blind decoding on control resource set 2, meanwhile the sum of the two cannot exceed the maximum number of times of blind decoding supported by the transmission unit. For example, if one transmission unit includes control resource set 1 and control resource set 2, where a size of control resource set 1 is three times that of control resource set 2, and the maximum number of times of blind decoding supported by the transmission unit is 44 times, the maximum number of times of blind decoding the schedule signaling on control resource set 1 is 33, and the maximum number of times of blind decoding the schedule signaling on control resource set 2 is 11.

In the example, the maximum number of times of blind decoding supported by each transmission unit and the size of each control resource set on each transmission unit are acquired, and the maximum number of times of blind decoding supported by each transmission unit is allocated to the corresponding control resource set corresponding to the transmission unit according to the size of each control resource set, so that the UE can determine the maximum number of times of blind decoding the schedule signaling on each control resource set in a case that one or more control resource sets are configured for the UE.

Figure 10D:
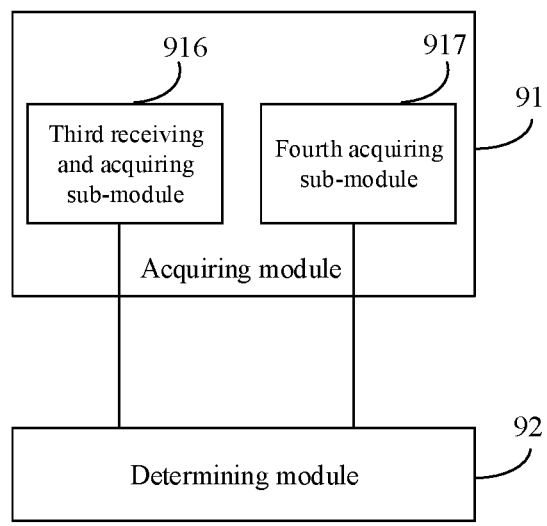
FIG. 10D is a block diagram illustrating another apparatus for determining a number of times of blind decoding schedule signaling according to an example.

FIG. 10D is a block diagram illustrating another apparatus for determining a number of times of blind decoding schedule signaling according to an example. As shown in FIG. 10D, on the basis of the example shown in FIG. 9, the acquiring module 91 may include a third receiving and acquiring sub-module 916 or a fourth acquiring sub-module 917.

The third receiving and acquiring sub-module 916 is configured to receive fifth configuration information transmitted by the base station, acquire an aggregation level supported by each control resource set on each transmission unit and a maximum number of times of blind decoding the schedule signaling corresponding to each aggregation level according to the fifth configuration information, and take the fifth configuration information as the control resource set attribute information, where the fifth configuration information includes the aggregation level supported by each control resource set and the maximum number of times of blind decoding the schedule signaling corresponding to each aggregation level.

In the example, the base station may transmit schedule signaling to UE with different aggregation levels. Thus, the UE needs to acquire the aggregation level supported by each control resource set.

The fourth acquiring sub-module 917 is configured to acquire the aggregation level supported by each control resource set on each transmission unit in a manner agreed by a system where the present UE is located, and take the aggregation level supported by each control resource set as the control resource set attribute information.

It is assumed that the UE needs to perform 6 times of decoding schedule signaling with aggregation level 1, 6 times of decoding schedule signaling with aggregation level 2, 2 times of decoding schedule signaling with aggregation level 4, and 2 times of decoding schedule signaling with aggregation level 8. At the same time, it is necessary to decode schedule signaling of two types of lengths in each aggregation level.

The determining module 92 may be configured to determine the maximum number of times of blind decoding the schedule signaling on each control resource set according to the aggregation level supported by each control resource set on each transmission unit and the maximum number of times of blind decoding the schedule signaling corresponding to each aggregation level.

In the example, the determining module 92 may be configured to calculate a sum of the maximum numbers of times of blind decoding the schedule signaling corresponding to respective ones of all the aggregation levels supported by each control resource set, and take a product of the calculated sum of the maximum numbers of times of blind decoding the schedule signaling and a number of types of the schedule signaling as the maximum number of times of blind decoding the schedule signaling corresponding to the control resource set.

It is assumed that the base station configures the UE as only supporting schedule signaling transmission at aggregation levels 1 and 2 on control resource set 1, and only supporting schedule signaling transmission at aggregation levels 4 and 8 on control resource set 2, then the UE has a maximum number of times of blind decoding on control resource set 1 being 24 times, and a maximum number of times of blind decoding on control resource set 2 being 8 times.

In the example, the aggregation level supported by each control resource set and the maximum number of times of blind decoding the schedule signaling corresponding to each aggregation level are acquired, and the maximum number of times of blind decoding the schedule signaling on each control resource set is determined according to the aggregation level supported by each control resource set and the maximum number of times of blind decoding the schedule signaling corresponding to each aggregation level, so that the UE can determine the maximum number of times of blind decoding the schedule signaling on each control resource set in a case that one or more control resource sets are configured for the UE.

Figure 11:
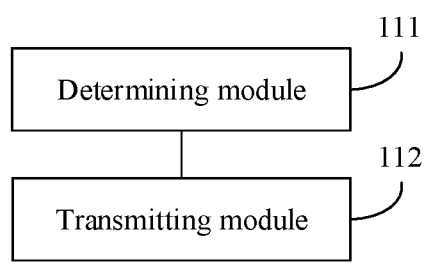
FIG. 11 is a block diagram illustrating still another apparatus for determining a number of times of blind decoding schedule signaling according to an example.

FIG. 11 is a block diagram illustrating still another apparatus for determining a number of times of blind decoding schedule signaling according to an example. As shown in FIG. 11, the apparatus includes a determining module 111 and a transmitting module 112.

The determining module 111 is configured to determine that a control resource set exists in at least one transmission unit of UE.

The transmitting module 112 is configured to transmit control resource set attribute information on each transmission unit to the UE, and transmit blind-decoding-time-number information associated with the control resource set attribute information to the UE, for the UE to determine a maximum number of times of blind decoding schedule signaling on each control resource set according to the control resource set attribute information and the blind-decoding-time-number information associated with the control resource set attribute information.

After the base station determines that a control resource set exists in at least one transmission unit of the UE, the base station transmits control resource set attribute information on each transmission unit to the UE. The control resource set attribute information may include, but is not limited to, at least one of, a number of control resource sets, a size of each control resource set, or an aggregation level supported by each control resource set.

In the example, the control resource set attribute information on each transmission unit and the blind-decoding-time-number information associated with the control resource set attribute information are transmitted to the UE, so that the UE can determine the maximum number of times of blind decoding the schedule signaling on each control resource set according to the control resource set attribute information and the blind-decoding-time-number information associated with the control resource set attribute information. Thus, the UE can determine the maximum number of times of blind decoding the schedule signaling on each control resource set in a case that one or more control resource sets are configured for the UE.

In an example, the transmitting module 112 may be configured to transmit first configuration information to the UE, for the UE to determine a maximum number of times of blind decoding supported by each transmission unit belonging to each transmission unit type according to the first configuration information, and take the maximum number of times of blind decoding supported by each transmission unit as the blind-decoding-time-number information associated with the control resource set attribute information. Or the transmitting module 112 may be configured to transmit second configuration information to the UE, for the UE to determine a maximum number of times of blind decoding supported by each transmission unit according to the second configuration information, and take the maximum number of times of blind decoding supported by each transmission unit as the blind-decoding-time-number information associated with the control resource set attribute information.

The first configuration information or the second configuration information may be carried in a system message, RRC signaling, a MAC CE, or physical layer signaling.

In an example, the transmitting module 112 may further be configured to transmit third configuration information including a number of control resource sets corresponding to each transmission unit to the UE, for the UE to acquire the number of control resource sets on each transmission unit according to the third configuration information.

In the example, the first and third configuration information are transmitted to the UE, so that the UE can acquire the maximum number of times of blind decoding supported by each transmission unit and the number of control resource sets on each transmission unit, based on which the UE can determine the maximum number of times of blind decoding schedule signaling on each control resource set.

In another example, the transmitting module 112 may further be configured to transmit fourth configuration information including a size of each control resource set corresponding to each transmission unit to the UE, for the UE to acquire the size of each control resource set on each transmission unit according to the fourth configuration information.

In the example, the first configuration information and the fourth configuration information are transmitted to the UE, so that the UE can acquire the maximum number of times of blind decoding supported by each transmission unit and the size of each control resource set on each transmission unit, based on which the UE can determine the maximum number of times of blind decoding schedule signaling on each control resource set.

In another example, the transmitting module 112 may be configured to transmit fifth configuration information to the UE, for the UE to acquire an aggregation level supported by each control resource set on each transmission unit and a maximum number of times of blind decoding the schedule signaling corresponding to each aggregation level according to the fifth configuration information, take the aggregation level supported by each control resource set as the control resource set attribute information, and take the maximum number of times of blind decoding the schedule signaling corresponding to each aggregation level as the blind-decoding-time-number information associated with the control resource set attribute information, where the fifth configuration information includes the aggregation level supported by each control resource set and the maximum number of times of blind decoding the schedule signaling corresponding to each aggregation level.

In the example, the fifth configuration information is transmitted to the UE, so that the UE can acquire the aggregation level supported by each control resource set on each transmission unit and the maximum number of times of blind decoding the schedule signaling corresponding to each aggregation level, based on which the UE can determine the maximum number of times of blind decoding the schedule signaling on each control resource set.

Figure 12:
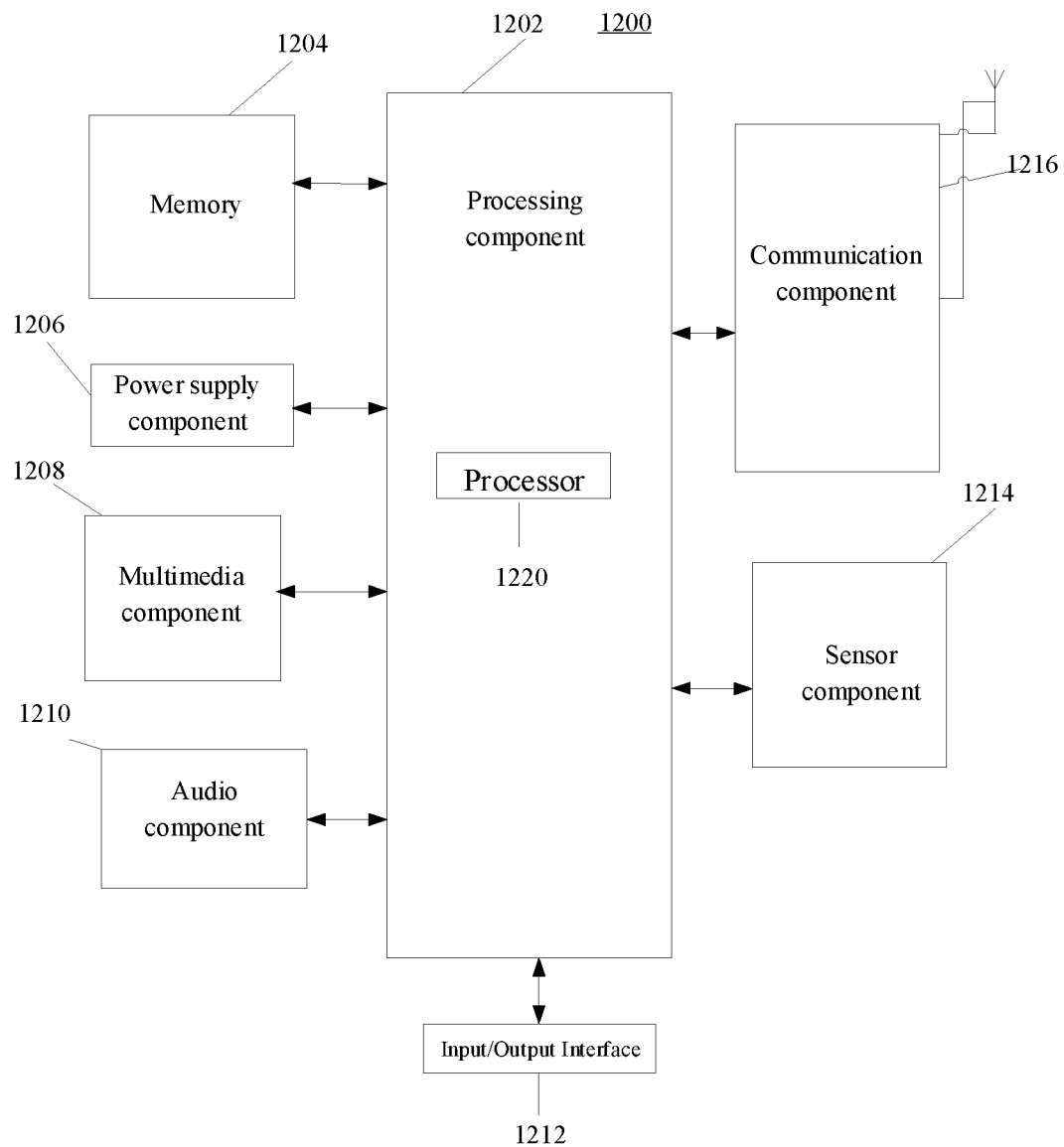
FIG. 12 is a block diagram illustrating an apparatus applicable for determining a number of times of blind decoding schedule signaling according to an example.

FIG. 12 is a block diagram illustrating an apparatus applicable for determining a number of times of blind decoding schedule signaling according to an example. For example, an apparatus 1200 may be UE, such as a mobile phone, a computer, a digital broadcast UE, a message sending and receiving device, a game console, a tablet device, a medical device, a fitness device, a personal digital assistant, etc.

As shown in FIG. 12, the apparatus 1200 may include one or more of the following components: a processing component 1202, a memory 1204, a power supply component 1206, a multimedia component 1208, an audio component 1210, an input/output (I/O) interface 1212, a sensor component 1214, and a communication component 1216.

The processing component 1202 generally controls overall operations of the apparatus 1200, such as operations associated with display, phone calls, data communications, camera operations, and recording operations. The processing component 1202 may include one or more processors 1220 to execute instructions to complete all or part of the steps of the above methods. In addition, the processing component 1202 may include one or more modules which facilitate the interaction between the processing component 1202 and other components. For example, the processing component 1202 may include a multimedia module to facilitate the interaction between the multimedia component 1208 and the processing component 1202.

The memory 1204 is to store various types of data to support the operation of the apparatus 1200. Examples of such data include instructions for any application or method operated on the apparatus 1200, contact data, telephone directory data, messages, pictures, videos and so on. The memory 1204 may be implemented by any type of volatile or non-volatile storage devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or compact disk.

The power supply component 1206 supplies power for different components of the apparatus 1200. The power supply component 1206 may include a power supply management system, one or more power supplies, and other components associated with generating, managing and distributing power for the apparatus 1200.

The multimedia component 1208 includes a screen providing an output interface between the apparatus 1200 and a user. In some examples, the screen may include a Liquid Crystal Display (LCD) and a Touch Panel (TP). If the screen includes the TP, the screen may be implemented as a touch screen to receive input signals from the user. The TP may include one or more touch sensors to sense touches, swipes, and gestures on the TP. The touch sensors may not only sense a boundary of a touch or swipe, but also sense a duration and a pressure associated with the touch or swipe. In some examples, the multimedia component 1208 may include a front camera and/or a rear camera. The front camera and/or rear camera may receive external multimedia data when the apparatus 1200 is in an operating mode, such as a photographing mode or a video mode. Each of the front camera and the rear camera may be a fixed optical lens system or have focal length and optical zooming capability.

The audio component 1210 is to output and/or input an audio signal. For example, the audio component 1210 includes a microphone (MIC). When the apparatus 1200 is in an operating mode, such as a call mode, a record mode and a voice recognition mode, the microphone is to receive an external audio signal. The received audio signal may be further stored in the memory 1204 or sent via the communication component 1216. In some examples, the audio component 1210 further includes a speaker for outputting an audio signal.

The I/O interface 1212 provides an interface between the processing component 1202 and a peripheral interface module. The above peripheral interface module may be a keyboard, a click wheel, buttons, or the like. These buttons may include but not limited to, a home button, a volume button, a start button and a lock button.

The sensor component 1214 includes one or more sensors to provide status assessments of various aspects for the apparatus 1200. For example, the sensor component 1214 may detect the on/off status of the apparatus 1200, and relative positioning of component, for example, the component is a display and a keypad of the apparatus 1200. The sensor component 1214 may also detect a change in position of the apparatus 1200 or a component of the apparatus 1200, a presence or absence of the contact between a user and the apparatus 1200, an orientation or an acceleration/deceleration of the apparatus 1200, and a change in temperature of the apparatus 1200. The sensor component 1214 may include a proximity sensor to detect the presence of a nearby object without any physical contact. The sensor component 1214 may further include an optical sensor, such as a Complementary Metal-Oxide-Semiconductor (CMOS) or Charged Coupled Device (CCD) image sensor which is used in imaging applications. In some examples, the sensor component 1214 may further include an acceleration sensor, a gyroscope sensor, a magnetic sensor, a pressure sensor, or a temperature sensor.

The communication component 1216 is to facilitate wired or wireless communication between the apparatus 1200 and other devices. The apparatus 1200 may access a wireless network based on a communication standard, such as Wi-Fi, 2G or 3G, or a combination thereof. In an example, the communication component 1216 receives a broadcast signal or broadcast related information from an external broadcast management system via a broadcast channel. In an example, the communication component 1216 may further include a Near Field Communication (NFC) module for promoting short-range communication. For example, the NFC module may be implemented based on a Radio Frequency Identification (RFID) technology, an Infrared Data Association (IrDA) technology, an Ultra-Wideband (UWB) technology, a Bluetooth® (BT) technology and other technologies.

In an example, the apparatus 1200 may be implemented by one or more Application Specific Integrated Circuits (ASICs), Digital Signal Processors (DSPs), Digital Signal Processing Devices (DSPDs), programmable Logic Devices (PLDs), Field Programmable Gate Arrays (FPGAs), controllers, microcontrollers, microprocessors, or other electronic components for performing the method described above.

In an example, there is further provided a non-transitory computer readable storage medium including instructions, such as the memory 1204 including instructions. The above instructions may be executed by the processor 1220 of the apparatus 1200 to complete the above method. For example, the non-transitory computer readable storage medium may be a Read-Only Memory (ROM), a Random Access Memory (RAM), a CD-ROM, a magnetic tape, a floppy disk, an optical data storage device, and so on.

Figure 13:
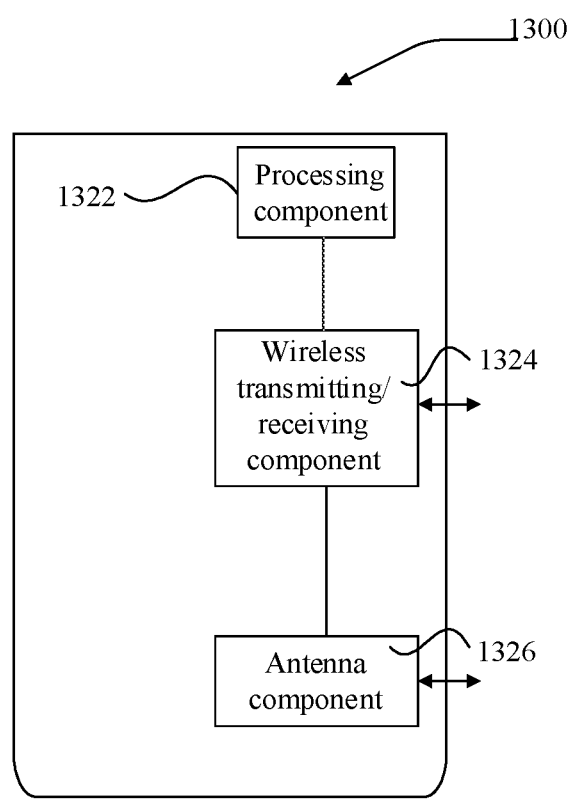
FIG. 13 is a block diagram illustrating another apparatus applicable for determining a number of times of blind decoding of schedule signaling according to an example.

FIG. 13 is a block diagram illustrating another apparatus applicable for determining a number of times of blind decoding schedule signaling according to an example. An apparatus 1300 can be provided as a base station. Referring to FIG. 13, the apparatus 1300 includes a processing component 1322, a wireless transmitting/receiving component 1324, an antenna component 1326, and a signal processing portion specific to the wireless interface. The processing component 1322 can further include one or more processors.

One processor of the processing components 1322 can be configured to:

determine that a control resource set exists in at least one transmission unit of UE; and transmit control resource set attribute information on each transmission unit to the UE, and transmit blind-decoding-time-number information associated with the control resource set attribute information to the UE, for the UE to determine a maximum number of times of blind decoding schedule signaling on each control resource set according to the control resource set attribute information and the blind-decoding-time-number information associated with the control resource set attribute information.

For the apparatus embodiment, since it basically corresponds to the method embodiment, reference may be made to the description of the part of the method embodiment. The apparatus embodiment described above are merely illustrative, where the units illustrated as separate components may or may not be physically separate, and the components displayed as units may or may not be physical units, that is may be located in one place or they can be distributed to multiple network elements. Some or all of the modules may be selected according to actual needs to achieve the objective of the solution of the embodiment. Those of ordinary skill in the art can understand and implement without any creative effort.

It should be noted that, as used herein, relational terms such as first and second are used merely to distinguish one entity or operation from another entity or operation, and do not necessarily require or imply there is any such actual relationship or order between these entities or operations. The terms "including", "comprising" or any other variant thereof are intended to include a non-exclusive inclusion, such that a process, a method, an article, or a device including a plurality of elements includes not only those elements but also other elements not specifically listed, or elements that are inherent to such a process, a method an article, or a device. An element defined by the phrase "comprising a . . . " without further limitation does not exclude the presence of additional identical elements in the process, method, article, or device that includes the element.

Other implementations of the present disclosure will be apparent to those skilled in the art from consideration of the specification and practice of the present disclosure herein. The present application is intended to cover any variations, uses, modification or adaptations of the present disclosure that follow the general principles thereof and include common knowledge or conventional technical means in the related art that are not disclosed in the present disclosure.

The specification and examples are considered as exemplary only, with a true scope and spirit of the present disclosure being indicated by the following claims.

It is to be understood that the present disclosure is not limited to the precise structure described above and shown in the accompanying drawings, and that various modifications and changes may be made without departing from the scope thereof. The scope of the present disclosure is limited only by the appended claims.

The invention claimed is:

1. A method of determining a number of blind decoding attempts of schedule signaling, comprising:
    acquiring control resource set attribute information for each transmission unit, wherein the control resource set attribute information indicates an attribute of a control resource set corresponding to the transmission unit, the transmission unit comprises a slot-based type of transmission unit or a symbol-based type of transmission unit, and one or more control resource sets are configured for the transmission unit, wherein each of the one or more control resource sets spreads across a portion of a frequency bandwidth of the transmission unit;
    acquiring number of blind decoding attempts information associated with the control resource set attribute information, wherein the number of blind decoding attempts information associated with the control resource set attribute information comprises a maximum number of blind decoding attempts supported by each transmission unit or a maximum number of blind decoding attempts of the schedule signaling corresponding to each aggregation level; and
    determining a maximum number of blind decoding attempts of the schedule signaling on each control resource set according to the control resource set attribute information and the number of blind decoding attempts information associated with the control resource set attribute information.

2. The method according to claim 1, wherein acquiring the number of blind decoding attempts information associated with the control resource set attribute information comprises:
    receiving first configuration information transmitted by a base station, and determining the maximum number of blind decoding attempts supported by each transmission unit belonging to each transmission unit type according to the first configuration information; or
    receiving second configuration information transmitted by the base station, and determining the maximum number of blind decoding attempts supported by each transmission unit according to the second configuration information; or
    determining the maximum number of blind decoding attempts supported by each transmission unit in a manner agreed by a system where present User Equipment (UE) is located.

3. The method according to claim 2, wherein acquiring the control resource set attribute information for each transmission unit comprises:
    receiving third configuration information transmitted by the base station, and acquiring a number of control resource sets for each transmission unit according to the third configuration information, wherein the third configuration information comprises the number of control resource sets corresponding to each transmission unit, and the control resource set attribute information comprises the number of control resource sets; and
    determining the maximum number of blind decoding attempts of the schedule signaling on each control resource set according to the control resource set attribute information and the number of blind decoding attempts information associated with the control resource set attribute information comprises:
    equally allocating the maximum number of blind decoding attempts supported by each transmission unit to each control resource set corresponding to the transmission unit according to the number of control resource sets, so as to acquire the maximum number of blind decoding attempts of the schedule signaling on each control resource set.

4. The method according to claim 2, wherein acquiring the control resource set attribute information for each transmission unit comprises:
    receiving fourth configuration information transmitted by the base station, and acquiring a size of each control resource set for each transmission unit according to the fourth configuration information, wherein the fourth configuration information comprises the size of each control resource set corresponding to each transmission unit, and the control resource set attribute information comprises the size of the control resource set; and
    determining the maximum number of blind decoding attempts of the schedule signaling on each control resource set according to the control resource set attribute information and the number of blind decoding attempts information associated with the control resource set attribute information comprises:
    allocating the maximum number of blind decoding attempts supported by each transmission unit to corresponding control resource sets corresponding to the transmission unit according to the size of each control resource set, so as to acquire the maximum number of blind decoding attempts of the schedule signaling on each control resource set.

5. The method according to claim 1, wherein acquiring the control resource set attribute information for each transmission unit and acquiring the number of blind decoding attempts information associated with the control resource set attribute information comprises:
    receiving fifth configuration information transmitted by a base station, and acquiring, according to the fifth configuration information, one or more aggregation levels supported by each control resource set for each transmission unit and the maximum number of blind decoding attempts of the schedule signaling corresponding to each aggregation level, wherein the fifth configuration information comprises the one or more aggregation levels supported by each control resource set and the maximum number of blind decoding attempts of the schedule signaling corresponding to each aggregation level, and the control resource set attribute information comprises the one or more aggregation levels supported by each control resource set; or
    acquiring the one or more aggregation levels supported by each control resource set for each transmission unit and the maximum number of blind decoding attempts of the schedule signaling corresponding to each aggregation level in a manner agreed by a system where present UE is located, wherein the control resource set attribute information comprises the more or more aggregation levels supported by each control resource set; and determining the maximum number of blind decoding attempts of the schedule signaling on each control resource set according to the control resource set attribute information and the number of blind decoding attempts information associated with the control resource set attribute information comprises:

determining the maximum number of blind decoding attempts of the schedule signaling on each control resource set according to the one or more aggregation levels supported by each control resource set for each transmission unit and the maximum number of blind decoding attempts of the schedule signaling corresponding to each aggregation level.

6. The method according to claim 5, wherein determining the maximum number of blind decoding attempts of the schedule signaling on each control resource set according to the one or more aggregation levels supported by each control resource set for each transmission unit and the maximum number of blind decoding attempts of the schedule signaling corresponding to each aggregation level comprises:

calculating a sum of the maximum numbers of blind decoding attempts of the schedule signaling corresponding to all the aggregation levels supported by each control resource set, and taking a product of the calculated sum and a number of types of the schedule signaling as the maximum number of blind decoding attempts of the schedule signaling corresponding to the control resource set.

7. A method of determining a number of blind decoding attempts of schedule signaling, comprising:

determining that one or more control resource sets are configured for at least one transmission unit of User Equipment (UE), wherein each of the one or more control resource sets spreads across a portion of a frequency bandwidth of the at least one transmission unit, and each transmission unit of the UE comprises a slot-based type of transmission unit or a symbol-based type of transmission unit; and transmitting control resource set attribute information for each transmission unit to the UE, and transmitting number of blind decoding attempts information associated with the control resource set attribute information to the UE, for the UE to determine a maximum number of blind decoding attempts of the schedule signaling on each control resource set according to the control resource set attribute information and the number of blind decoding attempts information associated with the control resource set attribute information, wherein the number of blind decoding attempts information associated with the control resource set attribute information comprises a maximum number of blind decoding attempts supported by each transmission unit or a maximum number of blind decoding attempts of the schedule signaling corresponding to each aggregation level.

8. The method according to claim 7, wherein transmitting the number of blind decoding attempts information associated with the control resource set attribute information to the UE comprises:

transmitting first configuration information to the UE, for the UE to determine the maximum number of blind decoding attempts supported by each transmission unit belonging to each transmission unit type according to the first configuration information; or transmitting second configuration information to the UE, for the UE to determine the maximum number of blind decoding attempts supported by each transmission unit according to the second configuration information.

9. The method according to claim 8, wherein transmitting the control resource set attribute information for each transmission unit to the UE comprises:

transmitting, to the UE, third configuration information comprising a number of control resource sets corresponding to each transmission unit, for the UE to acquire the number of control resource sets for each transmission unit according to the third configuration information, wherein the control resource set attribute information comprises the number of control resource sets.

10. The method according to claim 8, wherein transmitting the control resource set attribute information for each transmission unit to the UE comprises:

transmitting, to the UE, fourth configuration information comprising a size of each control resource set corresponding to each transmission unit, for the UE to acquire the size of each control resource set for each transmission unit according to the fourth configuration information, wherein the control resource set attribute information comprises the size of the control resource set.

11. The method according to claim 7, wherein transmitting the control resource set attribute information for each transmission unit to the UE and transmitting number of blind decoding attempts information associated with the control resource set attribute information to the UE comprise:

transmitting fifth configuration information to the UE, for the UE to acquire one or more aggregation levels supported by each control resource set for each transmission unit and the maximum number of blind decoding attempts of the schedule signaling corresponding to each aggregation level according to the fifth configuration information, wherein the fifth configuration information comprises the one or more aggregation levels supported by each control resource set and the maximum number of blind decoding attempts of the schedule signaling corresponding to each aggregation level, and the control resource set attribute information comprises the one or more aggregation levels supported by each control resource set.

12. User Equipment (UE), comprising:

a processor; and a memory for storing instructions executable by the processor, wherein, upon execution of the instructions, the processor is configured to:

acquire control resource set attribute information for each transmission unit, wherein the control resource set attribute information indicates an attribute of a control resource set corresponding to the transmission unit, the transmission unit comprises a slot-based type of transmission unit or a symbol-based type of transmission unit, and one or more control resource sets are configured for the transmission unit, wherein each of the one or more control resource sets spreads across a portion of the frequency bandwidth of the transmission unit;

acquire number of blind decoding attempts information associated with the control resource set attribute information, wherein the number of blind decoding attempts information associated with the control resource set attribute information comprises a maximum number of blind decoding attempts supported by each transmission unit or a maximum number of blind decoding attempts of the schedule signaling corresponding to each aggregation level; and determine the maximum number of blind decoding attempts of schedule signaling on each control resource set according to the control resource set attribute information and the number of blind decoding attempts information associated with the control resource set attribute information.

13. The UE according to claim 12, wherein acquiring the number of blind decoding attempts information associated with the control resource set attribute information comprises:

receiving first configuration information transmitted by a base station, and determining the maximum number of blind decoding attempts supported by each transmission unit belonging to each transmission unit type according to the first configuration information; or receiving second configuration information transmitted by the base station, and determining the maximum number of blind decoding attempts supported by each transmission unit according to the second configuration information; or determining the maximum number of blind decoding attempts supported by each transmission unit in a manner agreed by a system where present User Equipment (UE) is located.

14. The UE according to claim 13, wherein acquiring the control resource set attribute information for each transmission unit comprises:

receiving third configuration information transmitted by the base station, and acquiring a number of control resource sets for each transmission unit according to the third configuration information, wherein the third configuration information comprises the number of control resource sets corresponding to each transmission unit, and the control resource set attribute information comprises the number of control resource sets; and determining the maximum number of blind decoding attempts of the schedule signaling on each control resource set according to the control resource set attribute information and the number of blind decoding attempts information associated with the control resource set attribute information comprises:

equally allocating the maximum number of blind decoding attempts supported by each transmission unit to each control resource set corresponding to the transmission unit according to the number of control resource sets, so as to acquire the maximum number of blind decoding attempts of the schedule signaling on each control resource set.

15. The UE according to claim 13, wherein acquiring the control resource set attribute information for each transmission unit comprises:

receiving fourth configuration information transmitted by the base station, and acquiring a size of each control resource set for each transmission unit according to the fourth configuration information, wherein the fourth configuration information comprises the size of each control resource set corresponding to each transmission unit, and the control resource set attribute information comprises the size of the control resource set; and determining the maximum number of blind decoding attempts of the schedule signaling on each control resource set according to the control resource set attribute information and the number of blind decoding attempts information associated with the control resource set attribute information comprises:

allocating the maximum number of blind decoding attempts supported by each transmission unit to corresponding control resource sets corresponding to the transmission unit according to the size of each control resource set, so as to acquire the maximum number of blind decoding attempts of the schedule signaling on each control resource set.

16. The UE according to claim 12, wherein acquiring the control resource set attribute information for each transmission unit and acquiring the number of blind decoding attempts information associated with the control resource set attribute information comprises:

receiving fifth configuration information transmitted by a base station, and acquiring, according to the fifth configuration information, one or more aggregation levels supported by each control resource set for each transmission unit and the maximum number of blind decoding attempts of the schedule signaling corresponding to each aggregation level, wherein the fifth configuration information comprises the one or more aggregation levels supported by each control resource set and the maximum number of blind decoding attempts of the schedule signaling corresponding to each aggregation level, and the control resource set attribute information comprises the one or more aggregation levels supported by each control resource set; or acquiring the one or more aggregation levels supported by each control resource set for each transmission unit and the maximum number of blind decoding attempts of the schedule signaling corresponding to each aggregation level in a manner agreed by a system where present UE is located, wherein the control resource set attribute information comprises the one or more aggregation levels supported by each control resource set; and determining the maximum number of blind decoding attempts of the schedule signaling on each control resource set according to the control resource set attribute information and the number of blind decoding attempts information associated with the control resource set attribute information comprises:

determining the maximum number of blind decoding attempts of the schedule signaling on each control resource set according to the one or more aggregation levels supported by each control resource set for each transmission unit and the maximum number of blind decoding attempts of the schedule signaling corresponding to each aggregation level.

17. The UE according to claim 16, wherein determining the maximum number of blind decoding attempts of the schedule signaling on each control resource set according to the one or more aggregation levels supported by each control resource set for each transmission unit and the maximum number of blind decoding attempts of the schedule signaling corresponding to each aggregation level comprises:

calculating a sum of the maximum numbers of blind decoding attempts of the schedule signaling corresponding to all the aggregation levels supported by each control resource set, and taking a product of the calculated sum and a number of types of the schedule signaling as the maximum number of blind decoding attempts of the schedule signaling corresponding to the control resource set.

18. A base station, comprising:
a processor; and
a memory for storing instructions executable by the processor,
wherein, upon execution of the instructions, the processor is configured to:
determine that one or more control resource sets are configured for at least one transmission unit of User Equipment (UE), wherein each of the one or more control resource sets spreads across a portion of the frequency bandwidth of the at least one transmission unit, and each transmission unit of the UE comprises a slot-based type of transmission unit or a symbol-based type of transmission unit; and
transmit control resource set attribute information for each transmission unit to the UE, and transmit number of blind decoding attempts information associated with the control resource set attribute information to the UE, for the UE to determine a maximum number of blind decoding attempts of schedule signaling on each control resource set according to the control resource set attribute information and the number of blind decoding attempts information associated with the control resource set attribute information, wherein the number of blind decoding attempts information associated with the control resource set attribute information comprises a maximum number of blind decoding attempts supported by each transmission unit or a maximum number of blind decoding attempts of the schedule signaling corresponding to each aggregation level.

19. The base station according to claim 18, wherein transmitting the number of blind decoding attempts information associated with the control resource set attribute information to the UE comprises:
transmitting first configuration information to the UE, for the UE to determine the maximum number of blind decoding attempts supported by each transmission unit belonging to each transmission unit type according to the first configuration information; or
transmitting second configuration information to the UE, for the UE to determine the maximum number of blind decoding attempts supported by each transmission unit according to the second configuration information.

20. The base station according to claim 18, wherein transmitting the control resource set attribute information for each transmission unit to the UE and transmitting the number of blind decoding attempts information associated with the control resource set attribute information to the UE comprise:
transmitting fifth configuration information to the UE, for the UE to acquire one or more aggregation levels supported by each control resource set for each transmission unit and the maximum number of blind decoding attempts of the schedule signaling corresponding to each aggregation level according to the fifth configuration information, wherein the fifth configuration information comprises the one or more aggregation levels supported by each control resource set and the maximum number of blind decoding attempts of the schedule signaling corresponding to each aggregation level, and the control resource set attribute information comprises the one or more aggregation levels supported by each control resource set.

* * * * *